US005761655A

United States Patent [19]
Hoffman

[11] Patent Number: 5,761,655
[45] Date of Patent: Jun. 2, 1998

[54] IMAGE FILE STORAGE AND RETRIEVAL SYSTEM

[75] Inventor: Michael T. Hoffman, Durham, N.C.

[73] Assignee: Alphatronix, Inc., Research Triangle Park, N.C.

[21] Appl. No.: 208,195

[22] Filed: Mar. 10, 1994

Related U.S. Application Data

[63] Continuation of Ser. No. 534,176, Jun. 6, 1990, abandoned.
[51] Int. Cl.⁶ .................................................. G06F 17/30
[52] U.S. Cl. ...................................... 707/4; 707/3
[58] Field of Search ................................ 707/3, 4, 5

[56] References Cited

U.S. PATENT DOCUMENTS

| | | | |
|---|---|---|---|
| 4,495,566 | 1/1985 | Dickinson et al. | 395/600 |
| 4,645,459 | 2/1987 | Graf et al. | 707/102 |
| 4,817,050 | 3/1989 | Komatsu et al. | 395/600 |
| 4,870,568 | 9/1989 | Kahle et al. | 395/600 |
| 5,062,074 | 10/1991 | Kleinberger | 395/600 |
| 5,109,439 | 4/1992 | Froessl | 382/61 |
| 5,123,088 | 6/1992 | Kasahara et al. | 395/159 |
| 5,140,677 | 8/1992 | Fleming et al. | 395/159 |
| 5,201,048 | 4/1993 | Coulton et al. | 395/600 |
| 5,204,959 | 4/1993 | Sakuragi | 395/600 |
| 5,206,949 | 4/1993 | Cochran et al. | 395/600 |
| 5,257,349 | 10/1993 | Alexander | 395/159 |
| 5,404,507 | 4/1995 | Bohm et al. | 707/603 |
| 5,404,514 | 4/1995 | Kageneck et al. | 707/605 |
| 5,408,655 | 4/1995 | Oren et al. | 707/604 |

OTHER PUBLICATIONS

Tamura, Hideyuki, et al., "Image Database Systems—A Survey," *Pattern Recognition* vol. 17, No. 1, pp. 29–43, 1984.

European Patent Application, Publication No. 0380239; published Aug. 1, 1990.

Fusako Hirabayashi et al., "Information Retrieval Using Desired Impression Factors", *IEICE Trans. Fundamental,* vol. E75-A, Feb. 1992, pp. 189–195.

C. Batini et al., "Visual Query Systems: A Taxonomy[1]", *Science Publishers B.V. (North Holland)IFIP,* pp. 153–168, no date.

(List continued on next page.)

*Primary Examiner*—Thomas G. Black
*Assistant Examiner*—John C. Loomis
*Attorney, Agent, or Firm*—Staas & Halsey

[57] ABSTRACT

A system which creates, stores, retrieves and displays thumbnail images. The dominant colors of the image are displayed in the thumbnail images. The dominant colors in an image are determined using groups of pixels where the average color is used to select an appropriate dominant color for display. The size of the thumbnails displayed and the area set for displaying the thumbnails can be changed to allow visual review of either a large number of thumbnails or a smaller but larger size set of thumbnails. Thumbnails, and other image files and other related text files and non-related files can be indexed and searched using keywords by using keyword views into the stored files to indicate a match when the views designate the same file. The system allows a search to be based on a partial match of keywords. Searching can be performed using super-keywords, which are combinations of keywords and other file and data characteristics. Super-keywords can be combined with other super-keyword or keywords for searching purposes. To facilitate multimedia storage and searching and integration of off-line media into the system, the system includes a master directory having a full directory containing entries of each media as a branch of the master directory tree. The system also includes the utilities necessary to create, access, retrieve and update local and network accessed remote files on any type of media.

9 Claims, 36 Drawing Sheets

Microfiche Appendix Included
(2 Microfiche, 123 Pages)

OTHER PUBLICATIONS

Misuo Nagamachi, "An Image Technology Expert System and Its Application to Design Consultation", *International Journal of Human-Computer Interaction*, 3(3), (1991), pp. 267–279.

F. Jamrik et al., "A Visual Technique for Communicating Data", *Elsevier Science Publishers B.V. (North Holland) IFIP*, 1992, pp. 397–410.

Unnamed Document with pp. 904–915, no date.

Masaomi Oda, "Context Dependency Effect in the Formation of Image Concepts and its Application" *IEEE*, 1991, pp. 1673–1678.

Robert P. Futrelle et al., "Understanding Diagrams in Technical Documents", *Computer*, Jul. 1992, pp. 75–78.

T. Gevers et al., "Σnigma: An Image Retrieval System", *IEEE*, 1992, pp. 697–700.

Mariano P. Consens et al., "Visual Queries and Querying Visualizations", *Sigmond Record*, vol. 21, No. 1, Mar. 1992, pp. 39–46.

A. Del Bimbo et al., "3–D Visual Query Language for Image Databases", *Journal of Visual Languages and Computing*, 1992, 3, 257–271.

Steve Rosenthal, "Will picons, Micons or dicons supersede icons'", *MacWEEK*, vol: v3, Sep. 26, 1989, Issue: n34 p. 32(1).

Kazuyuki Tsuda et al., "IconicBrowser: An Iconic Retrieval System for Object–Oriented Databases", *IEEE*, 1989, 130–137.

Shi–Kuo Chang, "A Visual Language Compiler for Information Retrieval by Visual Reasoning", *IEEE, Transactions on Software Engineering*, vol. 16, No. 1, Oct. 1990, pp. 1136–1149.

Daniel A. Keim et al., "Visual Query Specification in a Multimedia Database System", *IEEE*, 1992, pp. 194–200.

Shi–kuo Chang, "Visual Reasoning For Information Retrieval From Very Large Databases", *IEEE*, 1989, pp. 1–6.

FIG. 7A

| FIELD DESCRIPTION | DATA TYPE |
|---|---|
| FILE ID | LONG |
| DOMINANT COLOR 1 | RGB |
| DOMINANT COLOR 2 | RGB |
| DOMINANT COLOR 3 | RGB |
| DOMINANT COLOR 4 | RGB |
| DOMINANT COLOR 5 | RGB |
| DOMINANT COLOR 6 | RGB |
| DOMINANT COLOR 7 | RGB |
| DOMINANT COLOR 8 | RGB |
| ORIGINAL WIDTH | INT |
| ORIGINAL HEIGHT | INT |
| THUMBNAIL WIDTH | INT |
| THUMBNAIL HEIGHT | INT |
| # OF COLORS | INT |
| COLOR TABLE (3 BYTE RGB'S) | 0..255 OF RGB |
| PIXEL DATA | W x H BYTES |

FIG. 7B

| FIELD DESCRIPTION | DATA TYPE |
|---|---|
| RED COMPONENT | BYTE |
| GREEN COMPONENT | BYTE |
| BLUE COMPONENT | BYTE |

FIG. 7C

| FIELD DESCRIPTION | DATA TYPE |
|---|---|
| FILE ID | LONG |
| DOMINANT COLORS | 0..7 OF RGB |
| ORIGINAL WIDTH | INT |
| ORIGINAL HEIGHT | INT |
| RECORD # | LONG |

CACHED THUMBNAIL STRUCTURE
(POINTED TO BY CacheTable ENTRIES)

| FIELD DESCRIPTION | DATA TYPE |
|---|---|
| IDTable INDEX | INT |
| PIXEL DATA | TWidth * THeight BYTES |

FIG. 19A

| | FIELD DESCRIPTION | DATA TYPE | |
|---|---|---|---|
| 513 | KEYWORD ID | INT | ⎫ |
| 514 | KEYWORD NAME | 16 BYTES | ⎬ 510 |
| | SUPER KEYWORD FLAG | INT | ⎭ |
| 515 | MINIMUM SIZE | LONG | |
| | MAXIMUM SIZE | LONG | |
| | MINIMUM DATE | LONG | |
| | MAXIMUM DATE | LONG | |
| | PARENT FILE ID | LONG | |
| | NAME WILDCARD | 32 BYTES | |
| 516 | KEYWORD ID 1 | INT | |
| | KEYWORD ID 2 | INT | |
| | KEYWORD ID 3 | INT | SUPER KEYWORD INFORMATION 511 |
| | KEYWORD ID 4 | INT | |
| | KEYWORD ID 5 | INT | |
| | KEYWORD ID 6 | INT | |
| | KEYWORD ID 7 | INT | |
| | KEYWORD ID 8 | INT | |
| 517 | DOMINANT COLOR 1 | RGB | |
| | DOMINANT COLOR 2 | RGB | |
| | DOMINANT COLOR 3 | RGB | |
| | DOMINANT COLOR 4 | RGB | |

512 points to the header row.

| | FIELD DESCRIPTION | DATA TYPE |
|---|---|---|
| 519 | KEYWORD ID | INT |
| 520 | RECORD # | LONG |

FIG. 23

DATABASE RECORD (570)

| RECORD # | FILE ID | PARENT ID | TYPE | NAME | OTHER FIELDS |
|---|---|---|---|---|---|
| 0 | 0 | -1 | Tjukebox | JUKEBOX 1 | ...... |
| 1 | 1 | -1 | Tjukebox | JUKEBOX 2 | ...... |
| 2 | 2 | 0 | Tvolume | VOLUME 1 | ...... |
| 3 | 3 | 0 | Tvolume | VOLUME 2 | ...... |
| 4 | 4 | 2 | Tdirectory | DIRECTORY 1 | ...... |
| 5 | 5 | 2 | Tdirectory | DIRECTORY 2 | ...... |
| 6 | 6 | 3 | Tdirectory | DIRECTORY 3 | ...... |
| 7 | 7 | 3 | Tdirectory | DIRECTORY 4 | ...... |
| 8 | 8 | 3 | Tfile | FILE 1 | ...... |
| 9 | 9 | 4 | Tfile | FILE 2 | ...... |
| 10 | 10 | 4 | Tfile | FILE 3 | ...... |
| 11 | 11 | 7 | Tfile | FILE 4 | ...... |
| 12 | 12 | 7 | Tfile | FILE 5 | ...... |
| 13 | 13 | 1 | Tvolume | VOLUME 3 | ...... |
| 14 | 14 | 1 | Tvolume | VOLUME 4 | ...... |
| 15 | 15 | 13 | Tdirectory | DIRECTORY 5 | ...... |
| 16 | 16 | 13 | Tdirectory | DIRECTORY 6 | ...... |
| 17 | 17 | 14 | Tdirectory | DIRECTORY 7 | ...... |
| 18 | 18 | 14 | Tdirectory | DIRECTORY 8 | ...... |
| 19 | 19 | 14 | Tfile | FILE 6 | ...... |
| 20 | 20 | 15 | Tfile | FILE 7 | ...... |
| 21 | 21 | 15 | Tfile | FILE 8 | ...... |
| 22 | 22 | 18 | Tfile | FILE 9 | ...... |
| 23 | 23 | 18 | Tfile | FILE 10 | ...... |

SORTED INDEX (575)

| PARENT ID | NAME | RECORD # |
|---|---|---|
| 0 | VOLUME 1 | 2 |
| 0 | VOLUME 2 | 3 |
| 1 | VOLUME 3 | 13 |
| 1 | VOLUME 4 | 14 |
| 2 | DIRECTORY 1 | 4 |
| 2 | DIRECTORY 2 | 5 |
| 3 | DIRECTORY 3 | 6 |
| 3 | DIRECTORY 4 | 7 |
| 3 | FILE 1 | 8 |
| 4 | FILE 2 | 9 |
| 4 | FILE 3 | 10 |
| 7 | FILE 4 | 11 |
| 7 | FILE 5 | 12 |
| 13 | DIRECTORY 5 | 15 |
| 13 | DIRECTORY 6 | 16 |
| 14 | DIRECTORY 7 | 17 |
| 14 | DIRECTORY 8 | 18 |
| 14 | FILE 6 | 19 |
| 15 | FILE 7 | 20 |
| 15 | FILE 8 | 21 |
| 18 | FILE 9 | 22 |
| 18 | FILE 10 | 23 |
| -1 | JUKEBOX 1 | 0 |
| -1 | JUKEBOX 2 | 1 |

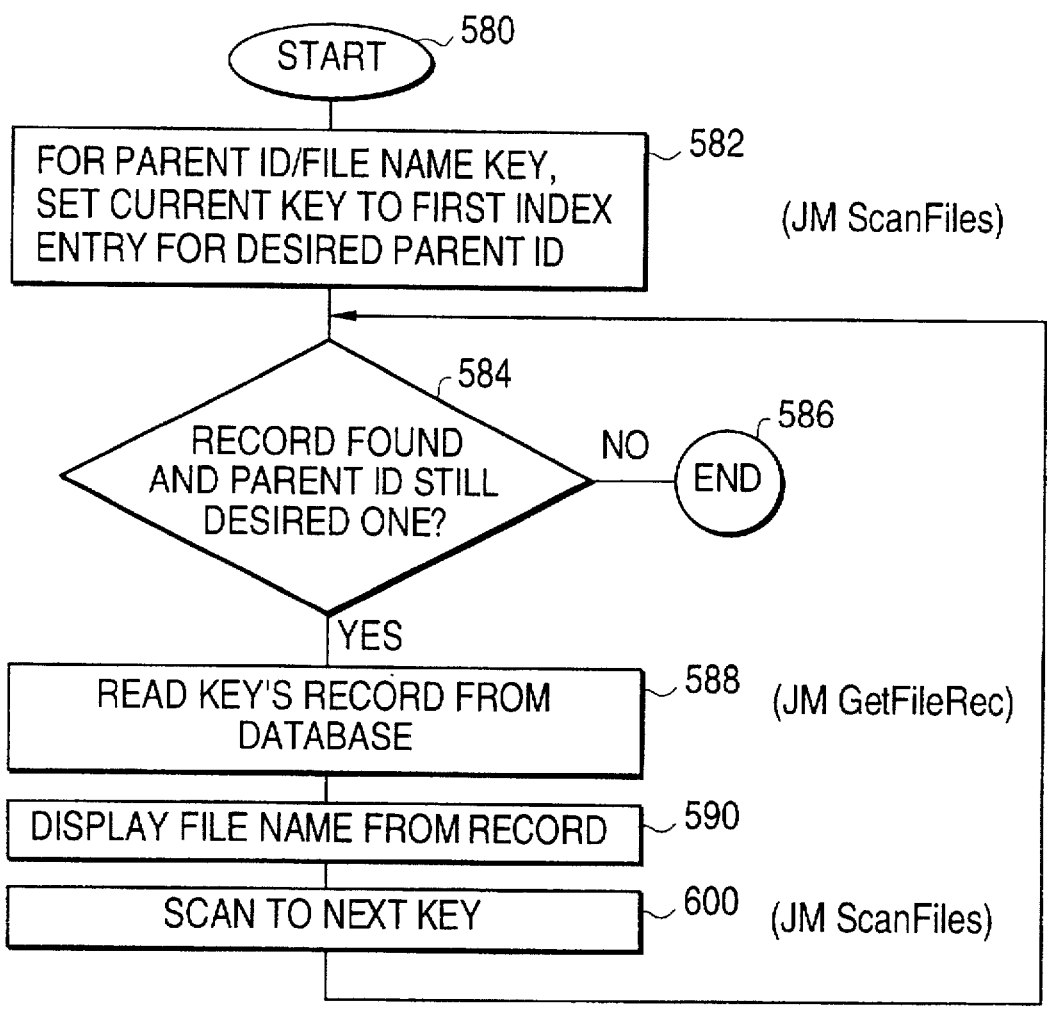

| NAME | MNEMONIC | TYPE | OFFSET |
|---|---|---|---|
| FILE IDENTIFIER | File ID | LONG | 0 |
| PARENT ENTRY FILE IDENTIFIER | Parent ID | LONG | 4 |
| VOLUME IDENTIFIER | Volume ID | LONG | 8 |
| FILE SIZE | File Size | LONG | 12 |
| FILE TYPE | File Type | INT | 16 |
| FILE ATTRIBUTES | File Attrib | INT | 18 |
| FILE CREATION DATE | File Create | LONG | 20 |
| FILE LAST MODIFY DATE | File LastMod | LONG | 24 |
| FILE CATEGORY | File Category | LONG | 28 |
| FILE NAME | File Name | 32 BYTES | 32 |
| KEYWORD INDENTIFIERS | File Keywords | 0..7 OF INT | 64 |
| | | TOTAL: | 80 |

| NAME | MNEMONIC | TYPE | OFFSET |
|---|---|---|---|
| FILE IDENTIFIER | File ID | LONG | 0 |
| RECORD NUMBER | | LONG | 4 |

| NAME | MNEMONIC | TYPE | OFFSET |
|---|---|---|---|
| PARENT ENTRY FILE IDENTIFIER | Parent ID | LONG | 0 |
| PARTIAL FILE NAME | File Name | 0..11 OF BYTES | 4 |
| RECORD NUMBER | | LONG | 16 |

| NAME | MNEMONIC | TYPE | OFFSET |
|---|---|---|---|
| VOLUME IDENTIFIER | Volume ID | LONG | 0 |
| FILE CATEGORY | File Category | LONG | 4 |
| RECORD NUMBER | | LONG | 8 |

| NAME | MNEMONIC | TYPE | OFFSET |
|---|---|---|---|
| PARTIAL FILE NAME | File Name | 0..11 OF BYTES | 0 |
| RECORD NUMBER | | LONG | 12 |

FIG. 27A

| NAME | MNEMONIC | TYPE | OFFSET | 640 |
|---|---|---|---|---|
| VOLUME IDENTIFIER | Volume ID | LONG | 0 | |
| MEDIA IDENTIFIER | Media ID | LONG | 4 | |
| MEDIA SIDE FOR VOLUME | Media Side | LONG | 8 | |
| VOLUME NAME | Volume Name[] | 0..31 OF CHAR | 12 | |
| | | TOTAL: | 44 | |

FIG. 27B

| NAME | MNEMONIC | TYPE | OFFSET | 642 |
|---|---|---|---|---|
| VOLUME IDENTIFIER | Volume ID | LONG | 0 | |
| RECORD NUMBER | | LONG | 4 | |

FIG. 27C

| NAME | MNEMONIC | TYPE | OFFSET | 644 |
|---|---|---|---|---|
| MEDIA IDENTIFIER | Media ID | LONG | 0 | |
| RECORD NUMBER | | LONG | 4 | |

FIG. 27D

| NAME | MNEMONIC | TYPE | OFFSET | 646 |
|---|---|---|---|---|
| PARTIAL VOLUME NAME | Volume ID | 0..15 OF BYTES | 0 | |
| RECORD NUMBER | | LONG | 16 | |

FIG. 28A

| NAME | MNEMONIC | TYPE | OFFSET |
|---|---|---|---|
| JUKEBOX TYPE IDENTIFIER | Jukebox Type | INT | 0 |
| JUKEBOX NAME | Jukebox Name[] | 0..31 OF CHAR | 2 |
| INTERFACE BUS NUMBER | Bus ID | INT | 34 |
| DEVICE ID ON BUS | Device ID | INT | 36 |
| LOGICAL UNIT NUMBER | Device LUN | INT | 38 |
| JUKEBOX ELEMENT GEOMETRY (SEE BELOW) | EleDat | ElementInfo | 40 |
| NUMBER OF DRIVES | Drive Count | INT | 56 |
| ARRAY OF DRIVE DESCRIPTORS (SEE BELOW) | DrvDat[] | 0..7 OF DriveInfo | 58 |
| NUMBER OF JOB PACKS | Jobpack Count | INT | 762 |
| ARRAY OF JOBPACK DESCRIPTORS (SEE BELOW) | JobpackDat[] | 0..7 OF JobPackInfo | 764 |
| SLOT/SIDE MEDIA ID'S | Storage Media[] | 0..511 OF LONG | 796 |
| SLOT/SIDE STATUS | Storage Status[] | 0..511 OF CHAR | 2844 |
| | | TOTAL: | 3356 |

| NAME | MNEMONIC | TYPE | OFFSET |
|---|---|---|---|
| ADDRESS OF FIRST TRANSPORT | Transport Addr | INT | 0 |
| NUMBER OF TRANSPORTS | Transport Count | INT | 2 |
| ADDRESS OF FIRST STORAGE SLOT | Storage Addr | INT | 4 |
| NUMBER OF STORAGE SLOTS | Storage Count | INT | 6 |
| ADDRESS OF FIRST MAILBOX | Mailbox Addr | INT | 8 |
| NUMBER OF MAILBOXES | Mailbox Count | INT | 10 |
| ADDRESS OF FIRST DRIVE | Transfer Addr | INT | 12 |
| NUMBER OF DRIVES | Transfer Count | INT | 14 |
| | | TOTAL: | 16 |

| NAME | MNEMONIC | TYPE | OFFSET |
|---|---|---|---|
| DRIVE TYPE IDENTIFIER | Drive Type | INT | 0 |
| INTERFACE BUS NUMBER | Bus ID | INT | 2 |
| DEVICE ID ON BUS | Device ID | INT | 4 |
| LOGICAL UNIT NUMBER | Device LUN | INT | 6 |
| MEDIA ID IN DRIVE | Media ID | LONG | 8 |
| STORAGE SLOT FOR MEDIA | Media Storage | INT | 12 |
| STORAGE SIDE FOR MEDIA | Media Side | CHAR | 14 |
| INVERT ON UNLOAD FLAG | Invert Flag | CHAR | 15 |
| MOUNTED FLAG | Mounted | INT | 16 |
| RESERVED FLAG | Reserved | INT | 18 |
| ABS. SECONDS OF LAST ACCESS | LastAccess | LONG | 20 |
| MOUNTED VOLUME NAME | Volume Name[] | 0..31 OF CHAR | 24 |
| O/S SPECIFIC DATA | OS Specific[] | 0..31 OF CHAR | 56 |
| | | TOTAL: | 88 |

| NAME | MNEMONIC | TYPE | OFFSET |
|---|---|---|---|
| FIRST STORAGE ADDRESS | Element Addr | INT | 0 |
| NUMBER OF STORAGE ELEMENTS | Element Count | INT | 2 |
| | | TOTAL: | 4 |

FIG. 29A

| NAME | MNEMONIC | TYPE | OFFSET |
|---|---|---|---|
| SYSTEM VERSION/REVISION # | Version | INT | 0 |
| SYSTEM IDENTIFIER ON NETWORK | System ID | INT | 2 |
| SYSTEM NAME | System Name[] | 0..31 OF CHAR | 4 |
| NEXT AVAILABLE MEDIA ID | Next Media ID | LONG | 36 |
| NEXT AVAILABLE VOLUME ID | Next Volume ID | LONG | 40 |
| NEXT AVAILABLE FILE ID | Next File ID | LONG | 44 |
| # OF RECOGNIZED JUKEBOX ID'S | JukeboxID Count | INT | 48 |
| JUKEBOX NAME ID'S (SEE BELOW) | JukeboxIDs[] | 0..3 OF NameIDs | 50 |
| # OF RECOGNIZED DRIVE ID'S | DriveID Count | INT | 178 |
| DRIVE NAME ID'S (SEE BELOW) | DriveIDs[] | 0..3 OF NameIDs | 180 |
| NUMBER OF JUKEBOXES | Jukebox Count | INT | 308 |
| NUMBER OF FILES | File Count | LONG | 310 |
| NUMBER OF VOLUMES | Volume Count | LONG | 314 |
| NUMBER OF MEDIA | Media Count | LONG | 318 |
| MAX DRIVE INACTIVITY IN SECS | Max Drive Age | LONG | 322 |
| MAX FILE INACTIVITY IN SECS | Max File Age | LONG | 326 |
| MAX USER INACTIVITY IN SECS | Max User Age | LONG | 330 |
| | | TOTAL: | 334 |

| NAME | MNEMONIC | TYPE | OFFSET |
|---|---|---|---|
| PRODUCT IDENTIFIER NAME | Name | 0..31 OF CHAR | 0 |
| | | TOTAL: | 32 |

642

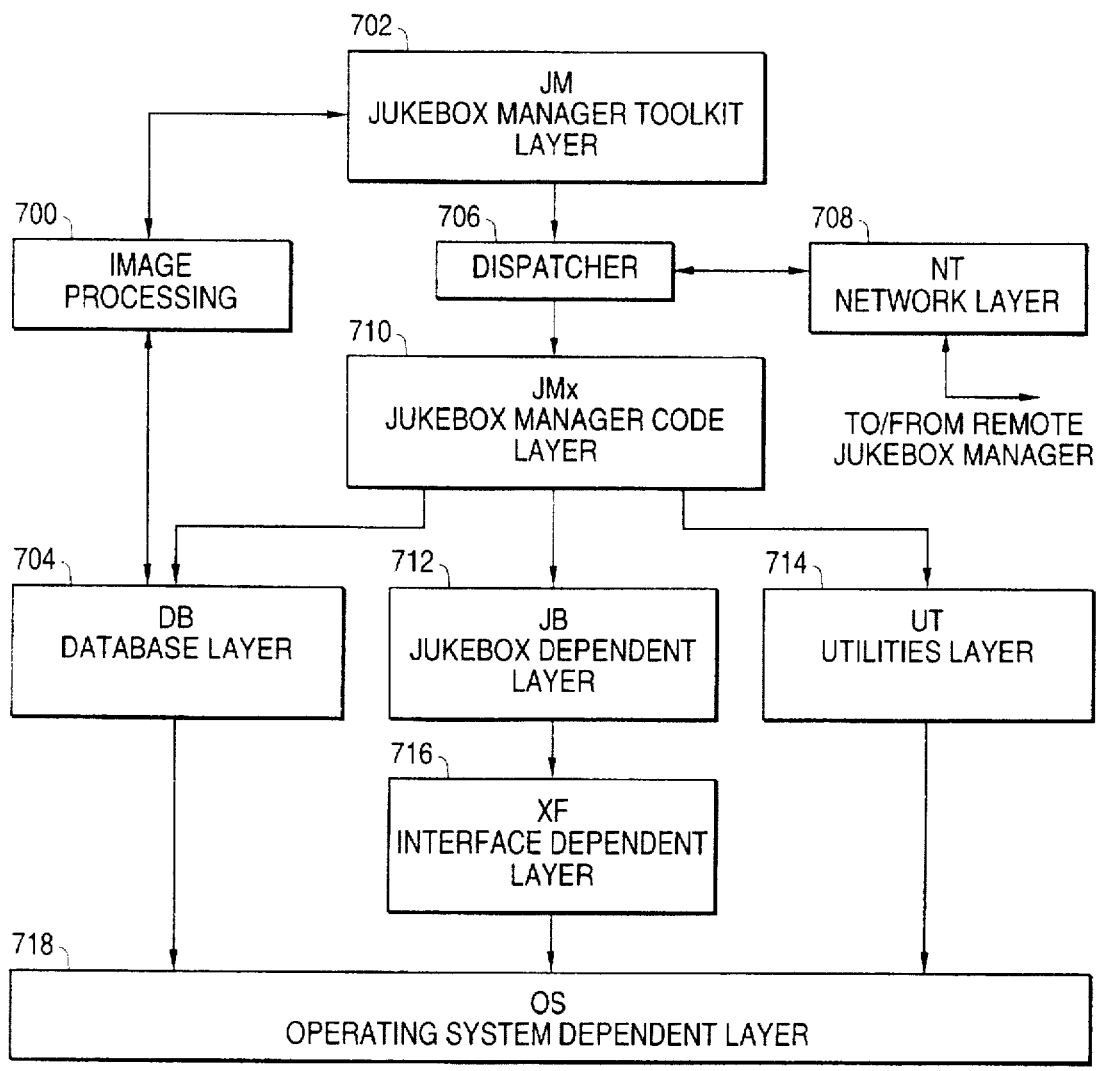

FIG. 31

| | NAME | MNEMONIC | TYPE | OFFSET |
|---|---|---|---|---|
| 732 | LENGTH OF COMMAND BLOCK | commandLen | INT | 0 |
| | COMMAND CODE | command | INT | 2 |
| | RETURN STATUS | status | INT | 4 |
| | DATA TRANSFER DIRECTION | dataDir | INT | 6 |
| 734 | DATA BUFFER ADDRESS | dataBuff | CHAR * | 8 |
| | DATA BUFFER LENGTH | dataLen | LONG | 12 |
| | USER IDENTIFIER | userID | LONG | 16 |
| | MODE OF OPERATION | mode | INT | 20 |
| | MEDIA IDENTIFIER | mediaID | LONG | 22 |
| | VOLUME IDENTIFIER | volumeID | LONG | 26 |
| | DIRECTORY FILE IDENTIFIER | directoryID | LONG | 30 |
| 736 | FILE IDENTIFIER | fileID | LONG | 34 |
| | FILE REFERENCE HANDLE | fileRef | INT | 38 |
| | FILE POSITION OFFSET | fileOffset | LONG | 40 |
| | JUKEBOX IDENTIFIER | jukebox | INT | 44 |
| | DRIVE NUMBER | drive | INT | 46 |
| | SOURCE ELEMENT NUMBER | srcEle | INT | 48 |
| | SOURCE ELEMENT TYPE | srcType | INT | 50 |
| 738 | MEDIA SIDE | side | INT | 52 |
| | DESTINATION ELEMENT NUMBER | destEle | INT | 54 |
| | DESTINATION ELEMENT TYPE | destType | INT | 56 |
| | RETRY COUNT | retry | INT | 58 |
| | TIMEOUT IN SECONDS | timeout | INT | 60 |
| | | | TOTAL: | 62 |

| NAME | MNEMONIC | TYPE | OFFSET |
|---|---|---|---|
| UNIQUE CLIENT IDENTIFIER | UserID | LONG | 0 |
| OPEN FILE HANDLE | FileHdl | INT | 4 |
| JUKEBOX ID FOR VOLUME | Jukebox | INT | 6 |
| DRIVE NUMBER MOUNTED ON | Drive | INT | 8 |
| LAST ACCESS ABSOLUTE SECONDS | LastAccess | LONG | 10 |
| FILE IDENTIFIER OF OPENED FILE | FileID | LONG | 14 |

| NAME | MNEMONIC | TYPE | OFFSET |
|---|---|---|---|
| UNIQUE CLIENT IDENTIFIER | UserID | LONG | 0 |
| KEY TYPE FOR DATABASE | KeyType | INT | 4 |
| DATABASE TYPE | DBType | INT | 6 |
| OPEN VIEW HANDLE | ViewHdl | INT | 8 |

FIG. 36

| NAME | MNEMONIC | TYPE | OFFSET |
|---|---|---|---|
| NODE DATA HAS CHANGED FLAG | ChangedFlag | INT | 0 |
| NODE IS NEWLY ALLOCATED FLAG | NewFlag | INT | 2 |
| NODE NUMBER | NodeNum | LONG | 4 |
| NODE DATA | Node | IndexNode | 8 |
| NUMBER OF TIMES ACCESSED | AccessCnt | LONG | 520 |
| | | TOTAL: | 524 |

FIG. 34

KEY STRUCTURE:

| NAME | MNEMONIC | TYPE | OFFSET |
|---|---|---|---|
| PARENT ENTRY FILE IDENTIFIER | Parent_ID | LONG | 0 |
| PARTIAL FILE NAME | File_Name | 0..11 OF BYTES | 4 |
| RECORD NUMBER | | LONG | 16 |

| DESIRED KEY: | LENGTH |
|---|---|
| 0001Image - AAAA 0020 | 20 |
| 0001Image - AABC 0050 | 20 |
| 0001Image - ACFA 0074 | 20 |
| 0002Image - BACG 0010 | 20 |
| TOTAL: | 80 |

| ACTUAL KEY: | LENGTH |
|---|---|
| 000001Image - AAAA 0020 | 21 |
| 12BC 0050 | 9 |
| 11CFA 0074 | 10 |
| 032Image - BACG 0010 | 18 |
| TOTAL: | 58 |

NOTE: FOR DISPLAY PURPOSES, PARENT IDS AND RECORD NUMBERS ARE SHOWN AS 4 DIGITS, AND THE LEADING LENGTH BYTE IS SHOWN AS 2 DIGITS.

FIG. 35A

| NAME | MNEMONIC | TYPE | OFFSET |
|---|---|---|---|
| FIRST NODE IN FREE NODE LIST | FreeNode | LONG | 0 |
| NUMBER OF NODES IN FILE | Node Count | LONG | 4 |
| NUMBER OF KEY TYPES DEFINED | KeyTypeCount | INT | 8 |
| KEY TYPE DESCRIPTORS | 0..5 of KeyType | KeyHdr | 10 |
| RESERVED PADDING BYTES | Reserved | 0..106 OF CHAR | 406 |
| | | TOTAL: | 512 |

FIG. 35B

| NAME | MNEMONIC | TYPE | OFFSET |
|---|---|---|---|
| NAME FOR THIS KEY TYPE | Name | 0..15 OF CHAR | 0 |
| ROOT NODE NUMBER | RootNode | LONG | 16 |
| TOTAL NUMBER KEYS | KeyCount | LONG | 20 |
| KEY COMPONENT DESCRIPTORS | 0..7 of Key | KeyPart | 24 |
| NUMBER OF COMPONENTS | KeyFieldCnt | INT | 56 |
| LENGTH OF KEY, INCLUDING REC # | KeyLength | INT | 58 |
| LENGTH INCLUDING NODE POINTER | EntryLength | INT | 60 |
| MAX KEYS IN NODE, UNPACKED | MaxKeyInNode | INT | 62 |
| MAX KEYS IN LEAF, UNPACKED | MaxKeyInLeaf | INT | 64 |
| | | TOTAL: | 66 |

FIG. 35C

| NAME | MNEMONIC | TYPE | OFFSET |
|---|---|---|---|
| BYTE POSITION IN RECORD | Position | INT | 0 |
| BYTE LENGTH OF PART | Length | INT | 2 |
| | | TOTAL: | 4 |

FIG. 35D

| NAME | MNEMONIC | TYPE | OFFSET |
|---|---|---|---|
| PARENT NODE INDICATOR | ParentFlag | 1 BIT | 0 |
| NUMBER OF ACTIVE KEYS IN NODE | KeysInNode | 15 BITS | 0 |
| NODE # OF PREVIOUS NODE | PrevNode | LONG | 2 |
| NODE NUMBER OF NEXT NODE | NextNode | LONG | 6 |
| KEY DATA | KeyData | 0..501 OF CHAR | 10 |
| | | TOTAL: | 512 |

IMAGE FILE STORAGE AND RETRIEVAL SYSTEM

This application is a continuation of application Ser. No. 07/534,176, filed Jun. 6, 1990, now abandoned.

REFERENCE TO MICROFICHE APPENDIX

A microfiche appendix including pseudocode for the operations of various portions of the present invention is attached hereto and incorporated by reference herein with a total number of fiche of two and a total number of frames of 123.

BACKGROUND OF THE INVENTION

1. Field of the Invention

The present invention is directed to methods and apparatus for creating and retrieving image data files in a computer system and, more particularly, to a system in which tens of thousands or even hundreds of thousands of files must be created and searched for retrieval, where the file retrieval process requires narrowing the number of files presented to the user and manually choosing the desired files out of the set presented and where selection can be by many different kinds of similarities thereby providing multi-dimensional organization of the files and also allowing the organization of many storage devices integrated with media autochangers to automatically bring off line files on line for access.

2. Description of the Related Art

An image data computer system can store tens of thousands or hundreds of thousands of files. Accordingly, storing such quantities of files can become a serious problem. Typically finding a file or a group of files requires two steps: first, narrowing the number of files to be presented to the user, and second, manually choosing the desired files out of the set to be presented. Most existing methods of both narrowing the number of files and selecting the files ignore important information which can be used to make the search process both more efficient and more natural to the user. The files on virtually all computer systems are organized as a hierarchical tree of directories (or folders in APPLE terminology). All references to the stored files are accomplished by specifying all or part of the directory hierarchy containing the desired file. Unfortunately, when many files, often numbering in the tens of thousands are present, this form of organizing files becomes inadequate. Files which are related to each other in more than one way can only be grouped together according to one primary similarity. Listing or operating on a set of files which are similar in other ways is very cumbersome.

Conventionally finding a file involves entering a file name or a partial file name template which is then used to search a part or all of the available storage devices. As files matching the given file name are encountered, they are shown in a textual list describing the exact location of the file. The user can then manually copy the desired file to a local work area or operate on the file directly. This method usually only works for storage media which is currently on-line and accessible to the computer.

Conventional file management programs allow files to be shown as a list of files sorted either purely alphabetically or alphabetically by directory tree. Desired files can then be selected individually or in groups to be copied to another storage area.

The situation worsens when searching for a file which is currently on a storage media, such as magnetic tape or a removable optical disk platter, which is off-line and not available to the computer. At best, a master directory exists on a storage device which is always on-line. When this is the case, the software program, which understands the master directory, is executed and a search similar to the one described above is performed for all off-line storage media. Once the desired file is found, the media containing the file must be manually loaded and placed on-line by the user or a storage librarian. Then, the file will be copied to a local work area for use.

In many environments including CAD; engineering, printing pre-press, medical imaging, data acquisition, architecture and document storage, users store many files which contain image data. When this is the case, there is an opportunity to find files with the additional aid of visual cues such as color information and miniature representations of the image, commonly called thumbnails. In conventional methods, the available storage is searched for all files containing image data. As image files are found, a miniature image is generated from the actual image file. The thumbnail images are then presented in a list on a graphic screen, along with other key file information such as file name and size. The user can then select the desired files by the thumbnail images. Conventional image selectors of this nature fall into two categories: integrated image selectors and image organizer programs.

Conventional programs which manipulate images, may include an image selector for selecting image files with which to work. When the user asks to select a file to work with, the program will scan part or all of the storage devices for image files which the program understands and will generate a thumbnail image for each file found. The desired image is then selected which is immediately opened and loaded into memory for further processing by the user. Existing programs which include this method of image selection are Studio/8 by Electronic Arts and ResEdit by Apple Computer Corp.

Conventional programs designed specifically for organizing images provide the same selection ability but typically save the thumbnails for each newly encountered image file in a master database or append the thumbnails to the actual file itself. This allows more efficient presentation of images in the future, also organizers will often allow keywords to be assigned to files or groups of files. These keywords can then be used to select a smaller group (i.e. only those tagged with the given keywords) of images from which to select. This is very important when a large number of images are being stored. Existing programs using this method of image selection are Curator by Solutions International.

Each known existing method has one or more of the following disadvantages: only one image can be selected at one time; thumbnail images can be presented in only one size; the size of the window used to present the thumbnail images is of fixed size; the thumbnail images are in black and white even for original color images; the thumbnails are generated each time the selection process is invoked; the images cannot be selected by key attributes such as size, color and age; custom selection criteria cannot be saved as super-keywords; where there is keyword support, images cannot be selected by matching m out of n keywords; keyword searching is very slow when more than a few files are being managed; files are presented in a directory hierarchy even when this does not represent natural boundaries between sets of files; organization is on a per volume basis and simultaneous selection across multiple volumes of media is not supported; only images which are currently on-line can be selected; and selected images can not be printed as a report.

SUMMARY OF THE INVENTION

It is an object of the present invention to generate thumbnails (i.e., thumbnail images) once and maintain them in a master database separate from the image files, allowing selection of images which are not currently on-line.

It is another object of the present invention to have thumbnails that contain full color information for better identification and to perform automatic color analysis and selection by dominant colors each criteria.

It is also an object of the present invention to provide a file qualification screen to be filled out before viewing thumbnails to allow the number of images presented to a user to be reduced significantly.

It is a further object of the invention to allow at any time a set of often used criteria to be saved as a super-keyword where super-keywords can be used like regular keywords when selecting files and used to automatically fill out the qualification screen, so that minor changes can be made before using it and where each user can have a custom set of super-keywords, allowing a personalized search process without cluttering the search for other users.

It is an additional object of the present invention to allow selection of those image files matching m out of n selected keywords including super-keywords allowing for a fudge-factor where some relevant images may not be tagged with all selected keywords and where super-keywords are actually entire templates of selection criteria which have been assigned a keyword name.

It is a further object of the present invention to allow searching for only those images residing in a particular directory or directory tree of a given storage device which is useful if individuals have unique working directories or if projects are broken up into different directories, or any other meaningful organization by directory.

It is also an object of the invention to present offline media as if they are directories, or folders of a directory containing all media.

It is an object of the invention to provide searching for only those files matching a certain file creation date range and/or only those matching a certain file size range.

It is a further object of the invention to provide for searching for only those files containing a certain set of key dominant colors so if one remembers approximately what color an image is, only those images with particular dominant colors will be shown where desired colors could be selected by colored check boxes or variable color sliders.

It is an object of the present invention to also provide searches for only those images of certain dimensions and/or only those matching a certain file name template and to allow single character replacement and multi-character replacement wildcards.

It is a still further object of the present invention once the qualification screen has been filled out and the search conducted, to allow all matching files to be listed in any one of many forms as follows: by thumbnail when size of thumbnail is user selectable, by file name, alphabetically (brief or detailed listing), by file name in a directory tree format or by file type, (brief or detailed listing), where once the files are shown in the desired format, files can be eliminated by deleting them from the shown list, or they can be selected for definite inclusion and where the size of the selection area can be set by the user, as well as the size of the thumbnail images.

It is also an object to allow the user before concluding the selection process, to modify the qualification screen to select additional files for inclusion.

It is still another object of the present invention once all desired files have been selected, to allow the entire set to be acted upon in any desired fashion which may include any one or more of the following actions: copy selected files from their current location to a local work area, delete selected files from their current location, print a report of selected files, and spool a selected file list for later action.

The above objects can be attained by a system which stores, retrieves and displays thumbnails of images with the dominant colors displayed in the thumbnails. The size of the thumbnails displayed can be changed to allow visually reviewing a large number or concentrating on a smaller number of but larger size images after reduction in the number of thumbnails. Thumbnails, as well as other image files and other related text files and non-related files can be indexed and searched using keywords. The system allows a search to be based on a partial match to the keywords. The searching can be performed using personalized super-keywords, which are combinations of keywords and other file and data characteristics, as keywords that can be combined with other super-keywords or non-super-keywords. To facilitate multi-media storage and searching as sell as the integration of off line media into the system, the system includes a master directory with the full directory of each media as a branch of the master directory tree represented as a linked flat file. The system also includes the utilities necessary to create, access, retrieve, update, etc. local as well as network accessed remote files on any type of media.

These together with other objects and advantages which will be subsequently apparent, reside in the details of construction and operation as more fully hereinafter described and claimed, reference being had to the accompanying drawings forming a part hereof, wherein like numerals reference to like parts throughout.

BRIEF DESCRIPTION OF THE DRAWINGS

FIGS. 7A–7C are data structures of the thumbnail database;

FIGS. 19A and 19B illustrate keyword and super-keyword database structures;

FIG. 23 illustrates a multi-media master system directory flat file;

FIG. 25 is a flowchart of the process for producing the screen of FIG. 20E from the database of FIG. 23;

FIGS. 26A–26E depict multi-media file information data structures;

FIGS. 27A–27D show multi-media volume information data structures;

FIGS. 28A–28D illustrate multi-media jukebox information data structures;

FIGS. 29A and 29B illustrate system or master multi-media data structures;

FIG. 30 illustrates the relationship between the modules of the jukebox or multi-media manager;

FIG. 31 illustrates the command structure of multi-media system commands;

FIG. 32 illustrates a file record for open jukebox or multi-media files;

FIG. 33 depicts an item in an array of key views;

FIG. 34 illustrates a packed key structure for an index file;

FIGS. 35A–35D and 36 depict index file data structures; and

DESCRIPTION OF THE PREFERRED EMBODIMENTS

Figure 1:
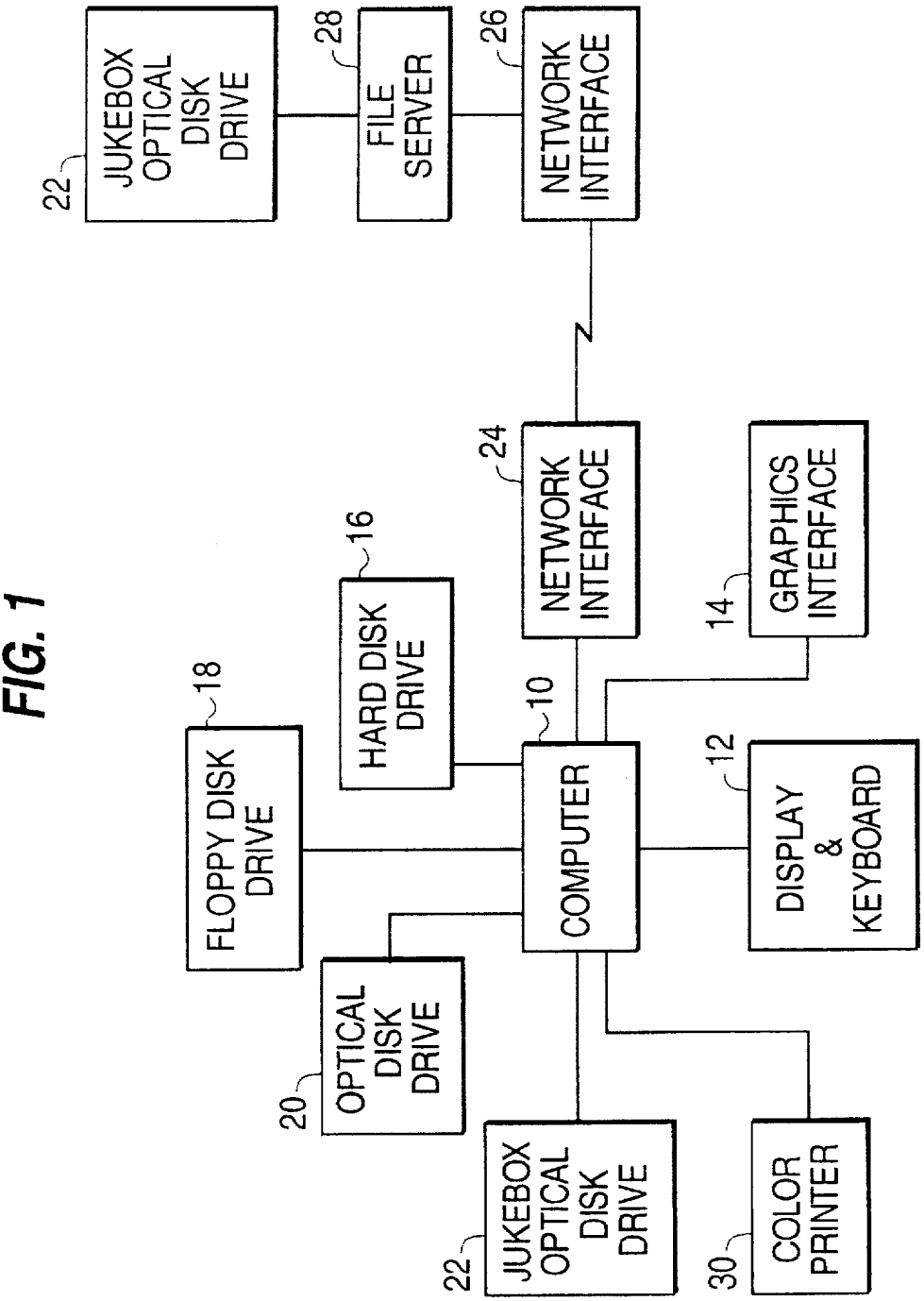
FIG. 1 illustrates the equipment configuration of the present system.

Desktop and workstation computers are being used for desktop publishing operations as well as for creating layouts for advertisements in magazines and on television. These systems allow the user to retrieve mixed format files such as image files, text files and data files from specific media such as hard disks. The present invention, as illustrated in FIG. 1, is designed to allow the user, accessing a computer 10 through a display and keyboard 12 or a graphic interface 14, to access such files not only on a conventional hard disk drive 16 and a conventional floppy disk drive 18, but also on a single disk optical disk drives such as the INSPIRE from Alphatronix Inc. of Research Triangle Park, N.C. but also from jukebox optical disk drive units 22 such as INSPIRE JUKEBOX available from Alphatronix Inc. as well as accessing such devices through network interfaces 24 and 26 and conventional file servers 28. The computer, preferably an Apple Mackintosh type computer, allows the editing and creation of new images which can be output to a color printer 30. The software is preferably written in the "C" language.

In conventional systems mixed format files and images can be cut and pasted together to create new files. As the image files are retrieved for review by conventional systems, thumbnails are created and displayed. These conventional thumbnails are presented in black and white. The present invention, to take advantage of the color remembrance capabilities of people produces color thumbnails.

Figure 2:
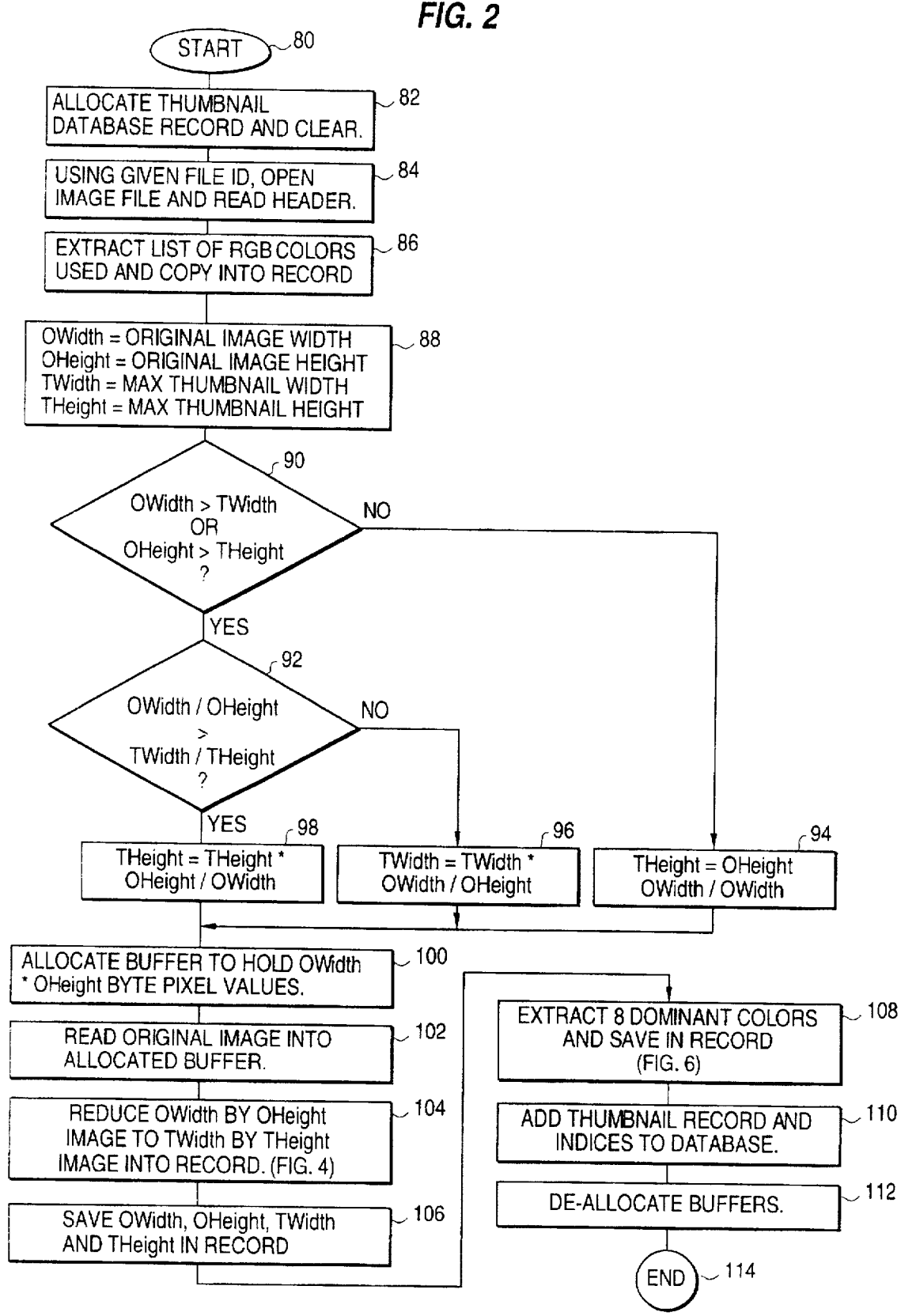
FIG. 2 is a flowchart of the thumbnail creation process.

To create a color thumbnail the first operation, as illustrated in FIG. 2, is to allocate a thumbnail database record as in FIG. 14A. Next the system uses the file ID of the image file for which a thumbnail is to be created to open the file and read 84 the header. The system extracts, from a conventional TIFF or PICT image file header, a list of the RGB colors used and copies that into the color table of the record. The next step is to set 88 the original image size and the maximum thumbnail size. The system then compares the original image size parameters to the thumbnail size 90 and 92 and sets 94–98 the reduction parameters appropriately. Steps 90–98 essentially create a proportionately correct rectangle which fits inside the thumbnail rectangle. Once the parameters have been appropriately set, the system allocates 100 a buffer for the original image and loads 102 the buffer with the image. The system then reduces the original image to the thumbnail image, which will be discussed in more detail with respect to FIGS. 3–5, and stores the color data in the record. Next the original and thumbnail image size parameters are saved 106, followed by the extraction of the dominant colors from the original image which will be discussed in more detail with respect to FIG. 6. The system then adds the thumbnail record to the thumbnail database, as illustrated in FIGS. 7A and 7B, and adds a file ID index to a file ID index file for thumbnails, as illustrated in FIG. 7C adds dominant colors and the original size to the file. The system then deallocates 112 the buffers. This process is repeated for each of the image files for which a color thumbnail showing the dominant colors should be created.

Figure 3:
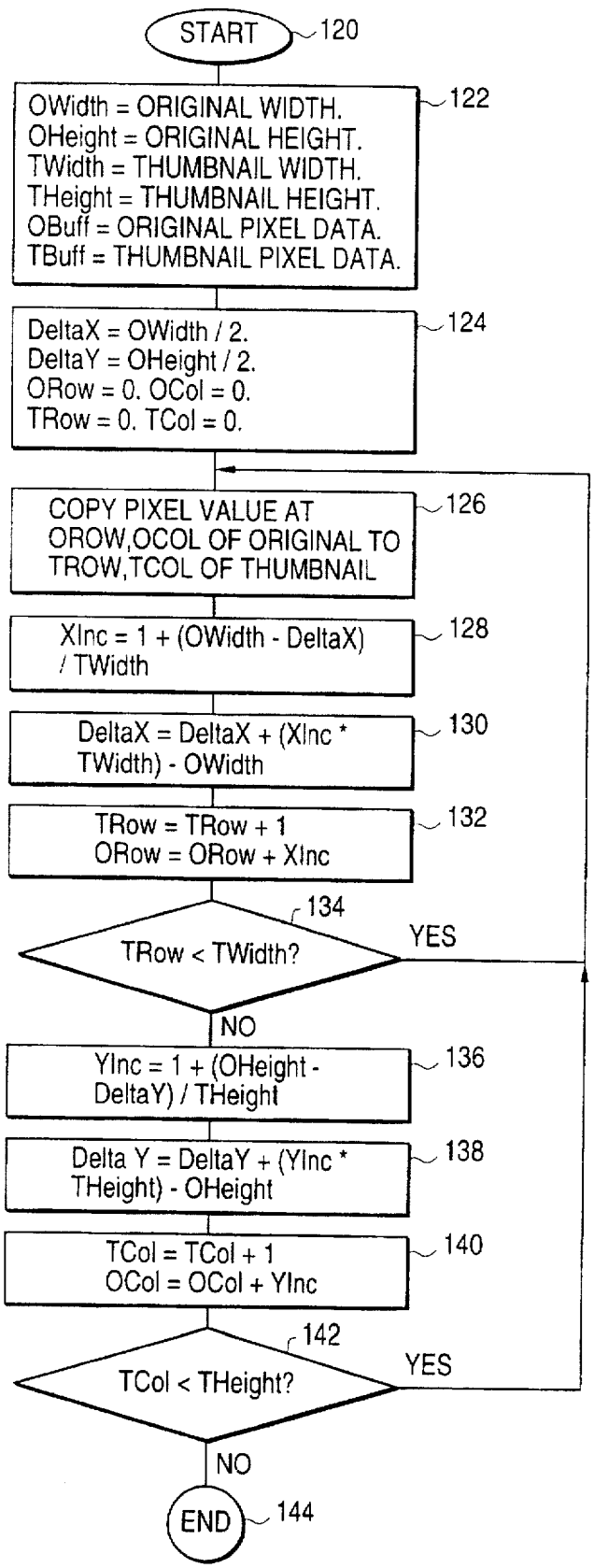
FIG. 3 illustrates a fast method of reducing an image to a thumbnail and a method of reducing thumbnails for variable size presentation.
Figure 4:
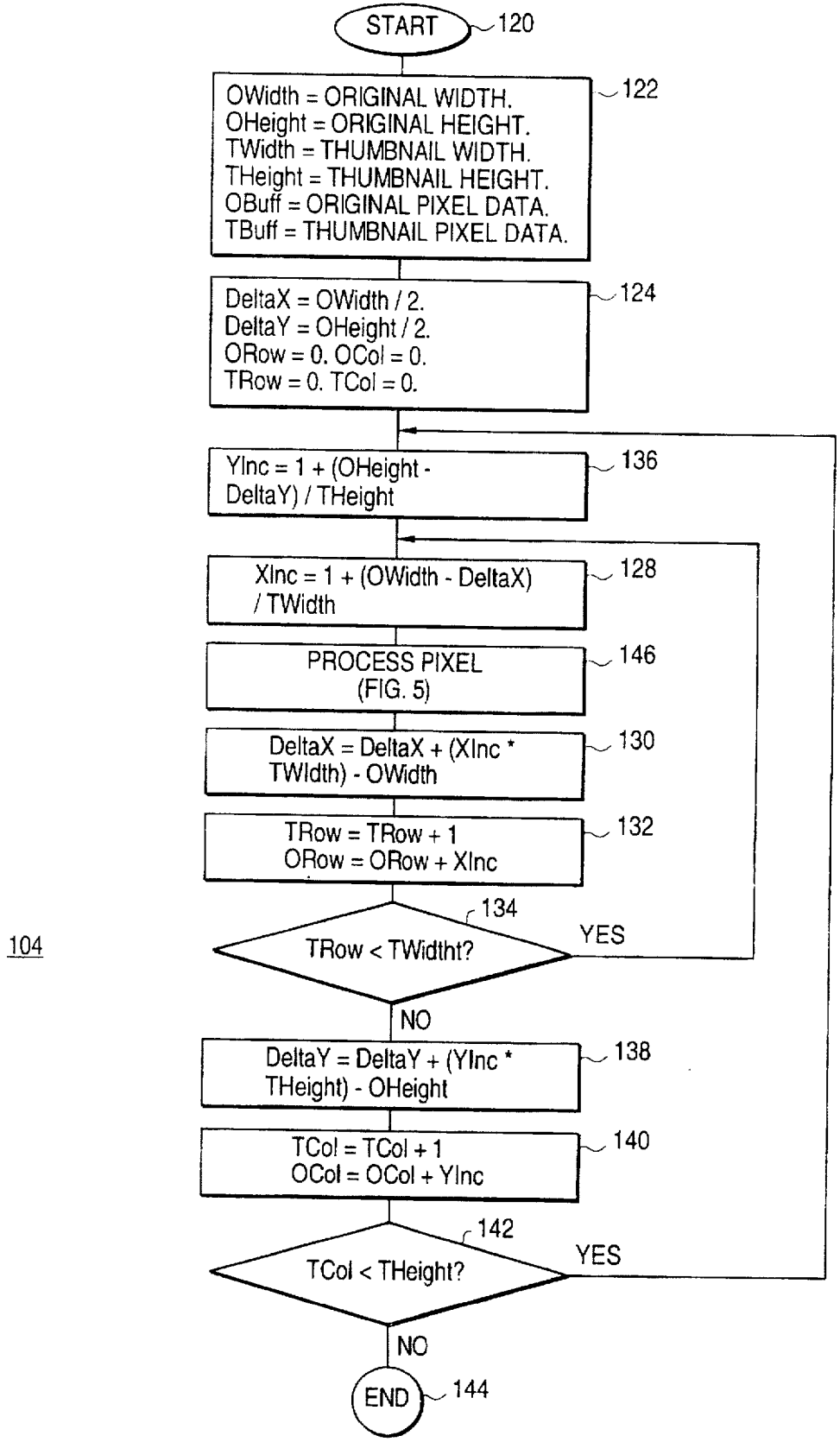
FIG. 4 illustrates the preferred method of reducing an image to a thumbnail.

FIGS. 3 and 4 illustrate, respectively, a fast method of reducing an image to a thumbnail or reducing a thumbnail to a smaller size, and a better, preferred and slower method of reducing an image to a thumbnail.

The fast method of FIG. 3, starts by setting 122 internal image size and buffer variables and then initializes 124 image scan conversion parameters deltax and deltay and initializes row and column pointers for the original and thumbnail images. Next the system copies 126 the pixel value pointed to by the pointers from the original image to the thumbnail image file record being created, as illustrated in FIG. 7A. The system then determines 128 a scan increment in the original image, adjusts 130 the X direction scan change parameter, followed by updating 132 the thumbnail and original image row pointers. The system then tests 134 to determine whether the end of the row has been reached, if not, the system loops back and continues copying pixels. If the end of the row has been reached, the system performs the same increment setting 136, scan parameter change setting 138 and updating 140 of the image column pointers. If the end of the columns has not been reached 142 a loop back occurs, otherwise the image reduction is complete.

In the preferred method of reducing the image to a thumbnail, as illustrated in FIG. 4, the same steps except for the pixel copy steps are performed but they are performed in a different order as illustrated by the rearrangement of steps and reference numerals of FIG. 4. As a substitute for the copy operation 126 illustrated in FIG. 3, a process pixel operation 146 is performed which is discussed in more detail in FIG. 5.

Figure 5:
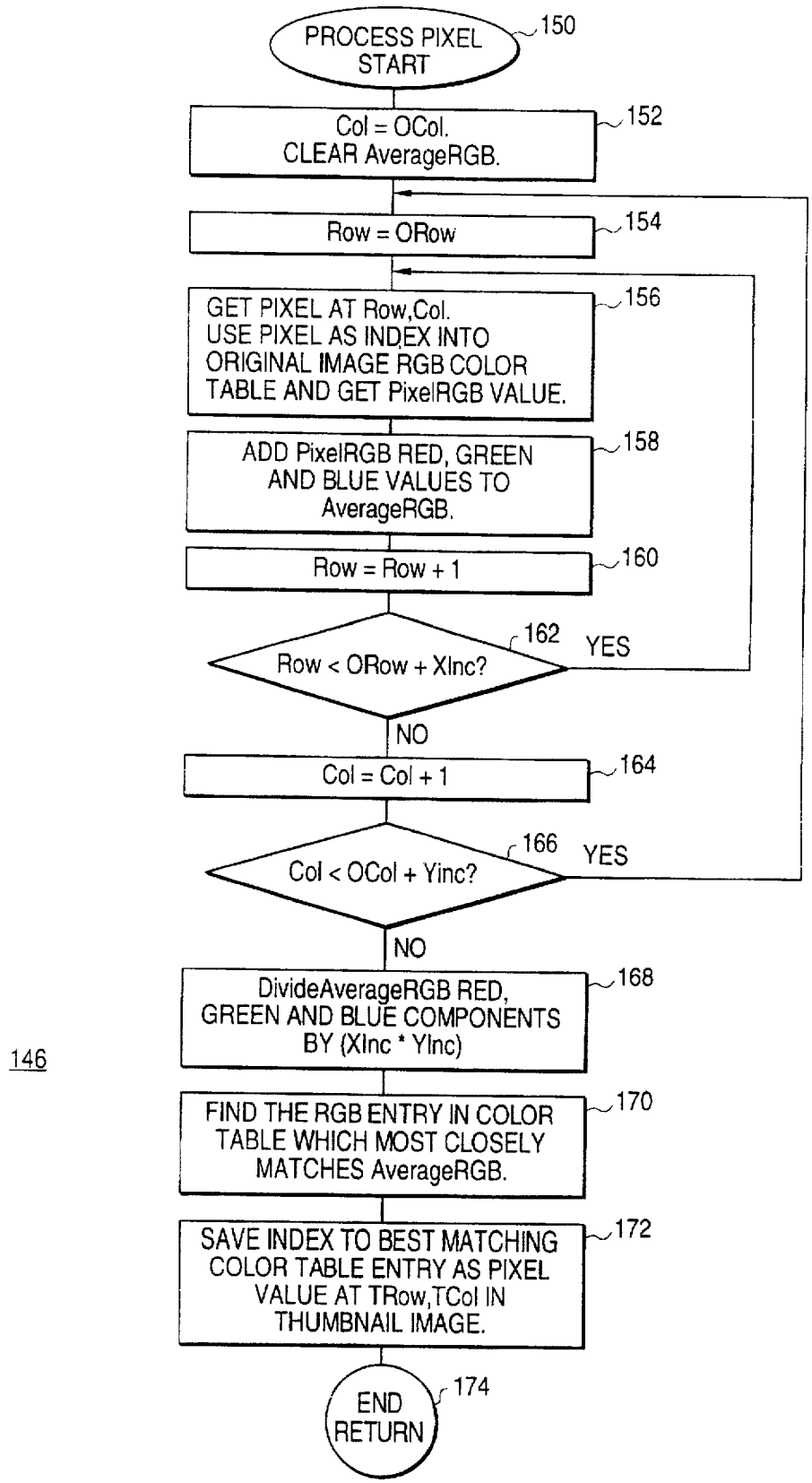
FIG. 5 illustrates the pixel processing for the method of FIG. 4.

This pixel process routine 146 of FIG. 5 starts by setting 152 a column pointer, clearing a variable used to determine the average color, followed by setting 154 a row pointer. The process then enters into a loop which determines the average RGB values for a group of pixels in or a portion of the original image corresponding to the amount by which the scan increment in the original image is changed. To perform the operation, the routine 146 first obtains 156 the red, green and blue color values corresponding to the pixel and adds 158 these to the average value. The system then increments 160 and tests 162 the row value and increments 164 and tests the column value to see if the edges of the image portion to be averaged have been reached. If the red, green and blue (RGB) values for all the pixels have been added for the portion of the image to be averaged, the average is computed 168. The system then accesses the original image color table 170 and obtains the RGB value which most closely matches this value. This closest match is saved 172 as the pixel in the thumbnail image.

The present invention, to take further advantage of the human ability to remember colors, calculates key or dominant colors in an image and stores them in the master database for each image. Several extraction methods for determining the dominant colors in an image are possible.

In a first method, in an image with n possible colors each having a specific RGB value, the number of times each of those n colors occur in the image is counted and the RGB values for those colors with the highest counts are stored. This method, though fast, does not take into consideration the variation in color perception around a reference color. For example, alternating pixels of red and blue will actually be seen as purple, a problem called dithering which is solved by method three discussed below. It is also possible for many close but not identical colors to be perceived as more dominant than in high count of another single color. This problem is solved by methods two and three below.

The second method is to count the number of times the n colors occur in an image as in the first method and then sort the colors by RGB values. For any group of RGB colors which are within a certain tolerance of one another, this second method takes the sum of their counts and calculates the average RGB value of the group. The individual colors are replaced with the newly calculated entry and the RGB values for those color entries with the highest counts are then stored.

Figure 6:
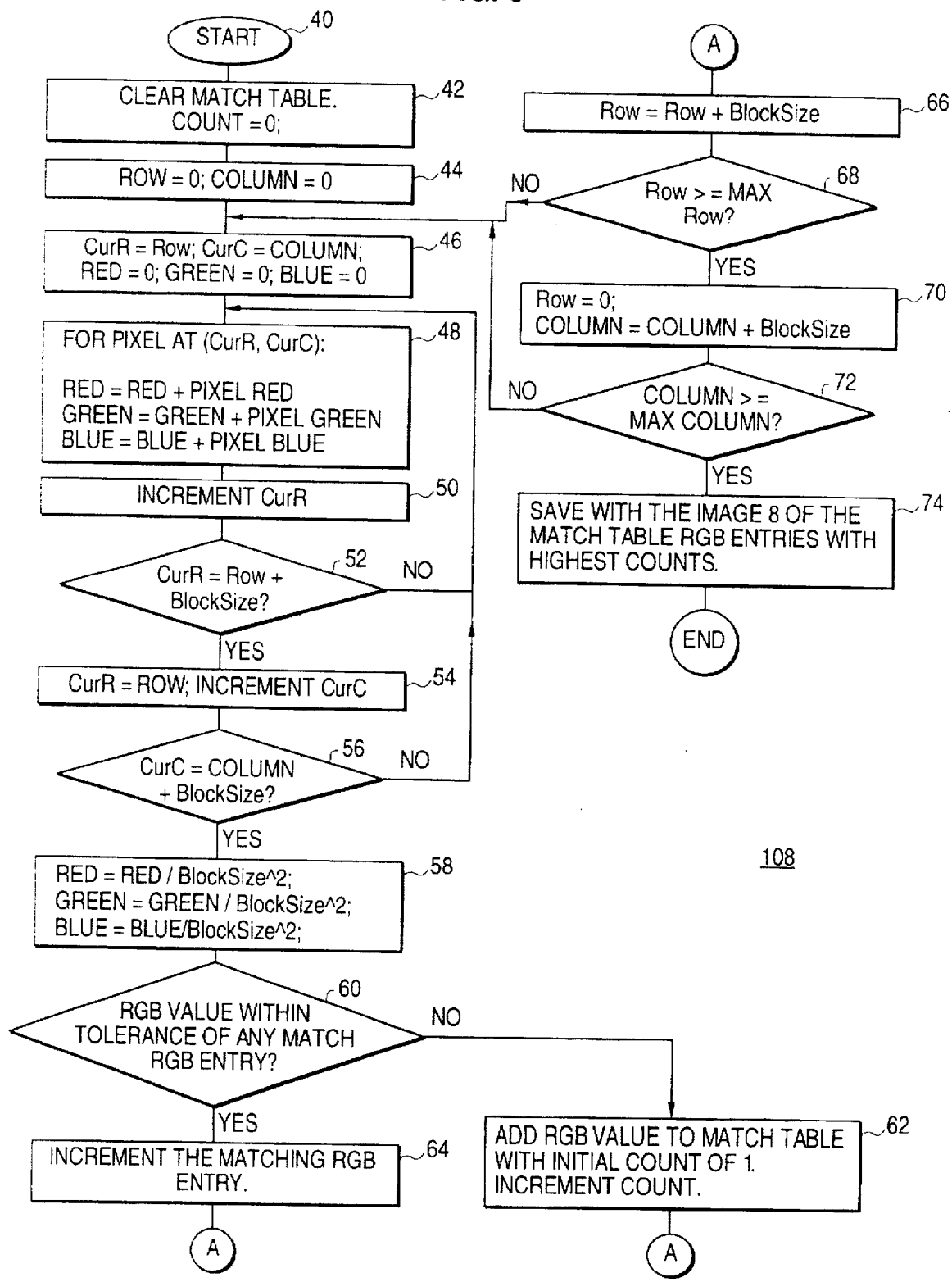
FIG. 6 is a flowchart of the preferred method of dominant color extraction.

The third and preferred method of extracting the dominant colors in an image, which is illustrated by FIG. 6, is to calculate the RGB values for each set of m by m neighboring pixels, where m is preferably 3. If the RGB value for this set of neighboring pixels is within a certain tolerance of an RGB entry in a matching RGB list, the count for that RGB value is incremented. The method then stores, with the image, the RGB values for those color entries with the highest counts. This method of extracting color information allows for dithered colors where the perceived color is due to the combined effect of many neighboring pixels. As illustrated in FIG. 6, dominant color extraction starts by clearing a match table, the count and the row and column pointers 42 and 44 for the current position within the image where a portion is being compressed. The match table when filled will be a list of colors occurring in the image and the count counts the entries in the match table. At this time it is also possible to preload the match table with eight normalized colors red, green, blue, purple, orange, yellow, black and white or with sixteen normalized colors. These colors would be initialized with a count of zero. The column and row counters for the portion of the image being compressed and the color values are reset 46. The process then enters a set of loops which count the number of red, green and blue pixels in the m by m set by first adding 48 to the red, green and blue count if the pixel includes the color, incrementing 50 the row counter, determining 52 whether the end of the row has been reached, incrementing 54 the column pointer and resetting the row pointer, and determining 56 whether the entire m×m set has been processed. The RGB value for the m×m set of neighboring pixels is determined 58 by dividing the total color values by the block size squared and then the average is tested 60 to determine whether the value is within a predetermined tolerance of an entry already existing in the match table. It is possible to determine a match with any number of tolerances, however, it is preferred that the colors match in accordance with $(\Delta red^2 + \Delta green^2 + \Delta blue^2) < n$-where n is preferably equal to five percent. If there is no matched table entry, that is, if the color is not close enough to a color already in the output list, a new entry is added 62 to the match table and the table entry count is incremented. Whenever a color entry is added the system relies on the conventional color translation algorithm of the computer system to pick the closest display color when the thumbnail is actually displayed. If there is a tolerance match, then the count for that entry is incremented 64. The process then decides whether the end of the image has been reached by incrementing 66 the row value and testing 68 the row value against the maximum row value. The value is reset if the row value has reached the maximum along with an update of the column value. The column value is also tested 72 to determine whether it has reached the maximum and if so the image is saved 74 with preferably the eight RGB table entries that have the highest counts. Although the above discussion has been predicated on trying to find the best match to the display palette, and adding a color entry if there is no best match, it is, of course, possible to force a match to the closest display palette color, which will result in the display being faster or to start the match table off with no preset color palette and allow the conventional translation to translate the dominant color identified. The preferred process is the best of both alternatives.

As previously discussed, a thumbnail record is created and stored in a separate thumbnail database along with appropriate indices for file ID and dominant color for each of the thumbnails produced. The thumbnail record structure is illustrated in FIG. 7A and includes a file ID 180, color values 182 for the dominant colors, the original image size 184, the thumbnail image size 186 and the number of colors 188 of the thumbnail. The thumbnail record also includes a color table 190 which includes red, green and blue color data 192 illustrated in FIG. 7B and the thumbnail pixel data 194. The pixel data 194 of the stored thumbnail does not always match the color palette of the display being used, especially if the thumbnail was created on a computer with one palette and is being displayed by another computer with a different palette, and the color table 60 is used to translate the actual color of the pixel data 194 into the closest color available within the available display palette. The software that comes with a Mackintosh computer called Mackintosh OS Color Quickdraw performs this translation automatically by selecting the closest match or creating a new palette color entry. The index for the file ID index file is illustrated in 7C and includes a file ID 196, a record number 202. A dominant color 198 and original height and width 200 allow index searches on three criteria.

Figure 8:
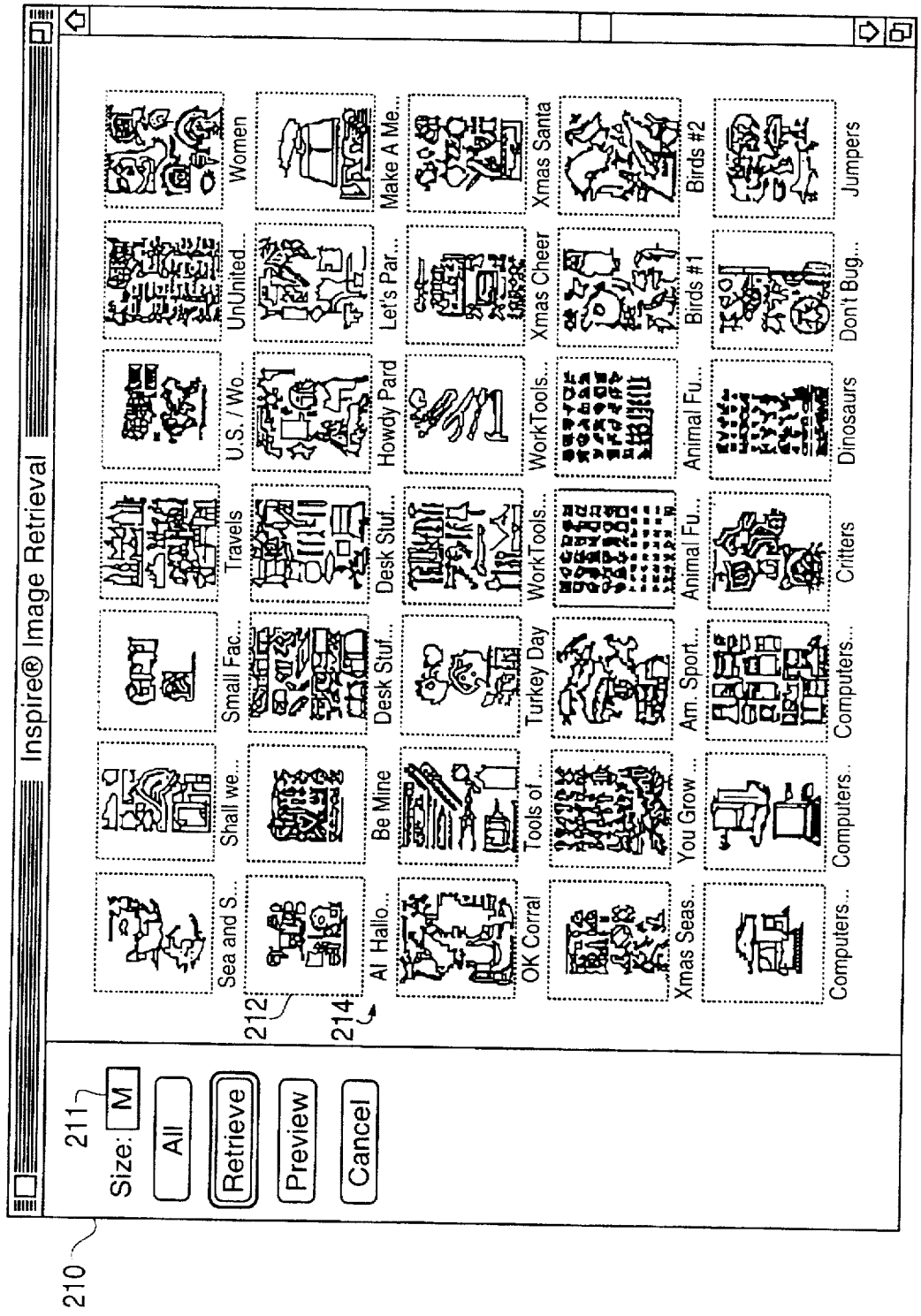
FIGS. 8–10 are screen displays showing thumbnail display variations.
Figure 9:
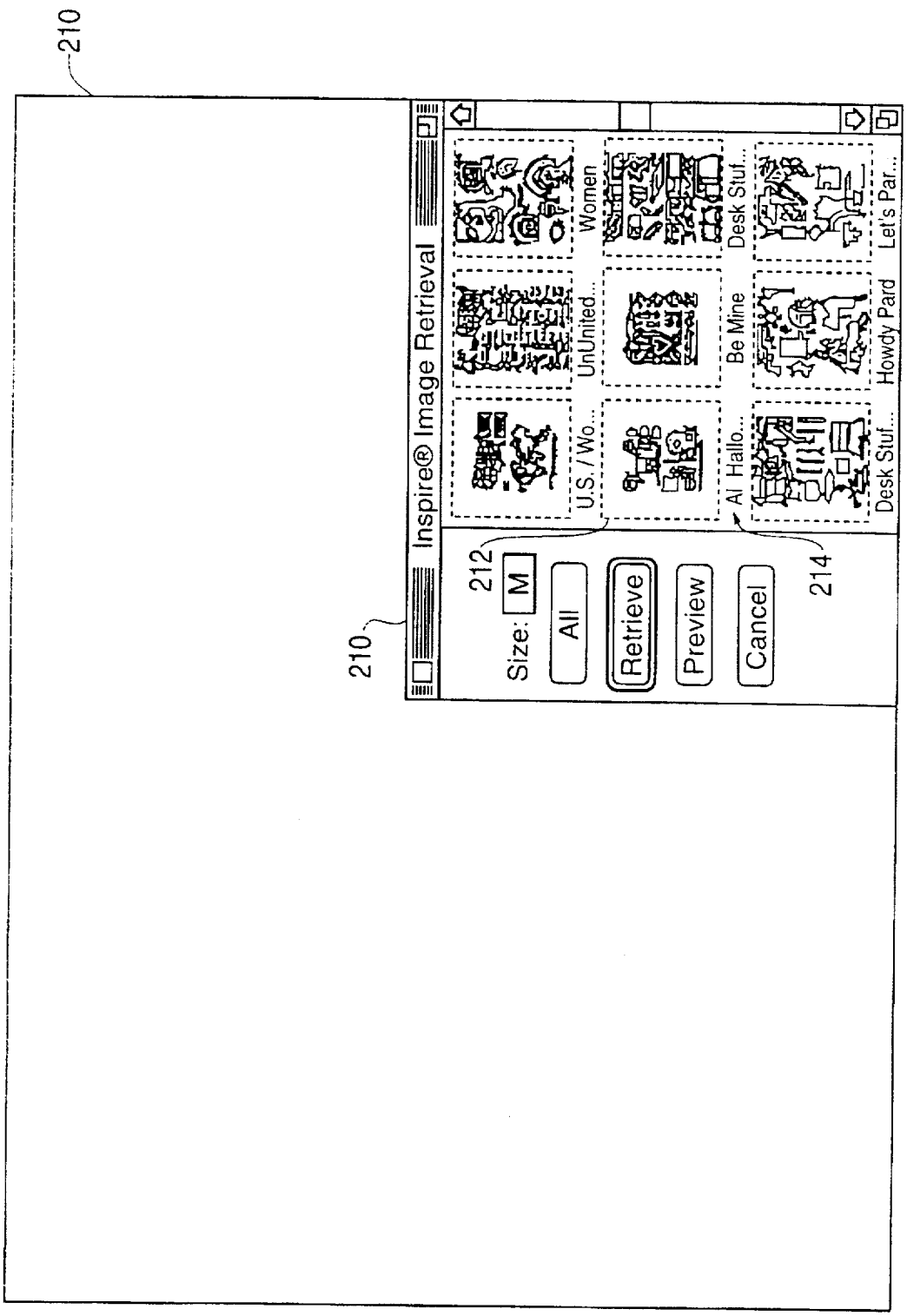
Figure 10:
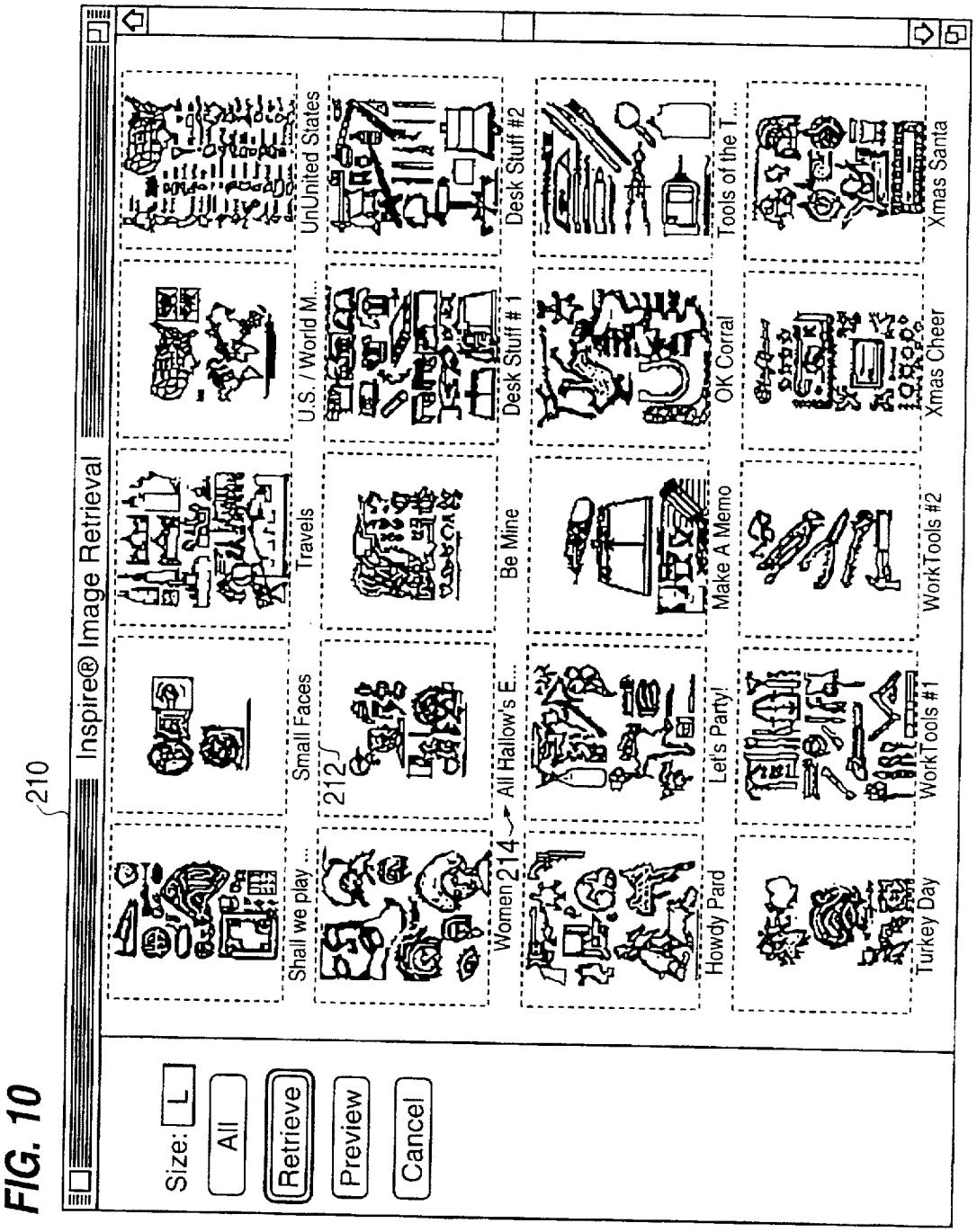

As will be discussed later with respect to the searching process, the present invention allows the user to designate search criteria for images as well as other types of files using a file qualification screen. This screen along with the keyword searching process will be discussed in more detail later. However, once the database search has been performed and the matching files have been obtained, the thumbnails are displayed for user review. The size of the thumbnails as well as the size of the viewing area can be changed as illustrated in FIGS. 8, 9 and 10 through the size selection cursor point 211. FIG. 8 illustrates thumbnails of medium size, which are in color in practice although this is not shown in the Figure, in a full screen image format where the entire screen 210 is occupied by the thumbnail display. As can be seen from FIG. 8, it can be difficult to determine what the thumbnail represents with respect to the original image and what the image descriptor 214 says. FIG. 9 illustrates medium size thumbnail images where only a portion of the screen is being used for images, allowing the remainder of the screen to be used for text or other data which needs to be combined with the images. FIG. 10 illustrates large size thumbnails using the full screen 210. The display allows the user to better identify the image from the thumbnail 212 and provides a larger portion of the image descriptor 214. The invention, as will be discussed in the flowcharts of FIGS. 11–13, allows the user to highlight image attributes, such as a descriptor provided along with the images as illustrated in FIGS. 8–10, to be stored for use in a later search. This screen in its various sizes can also be used to "click-on" (select) dominant colors within any image for transfer back to the file selection screen (See FIG. 15) for a further search.

Figure 11:
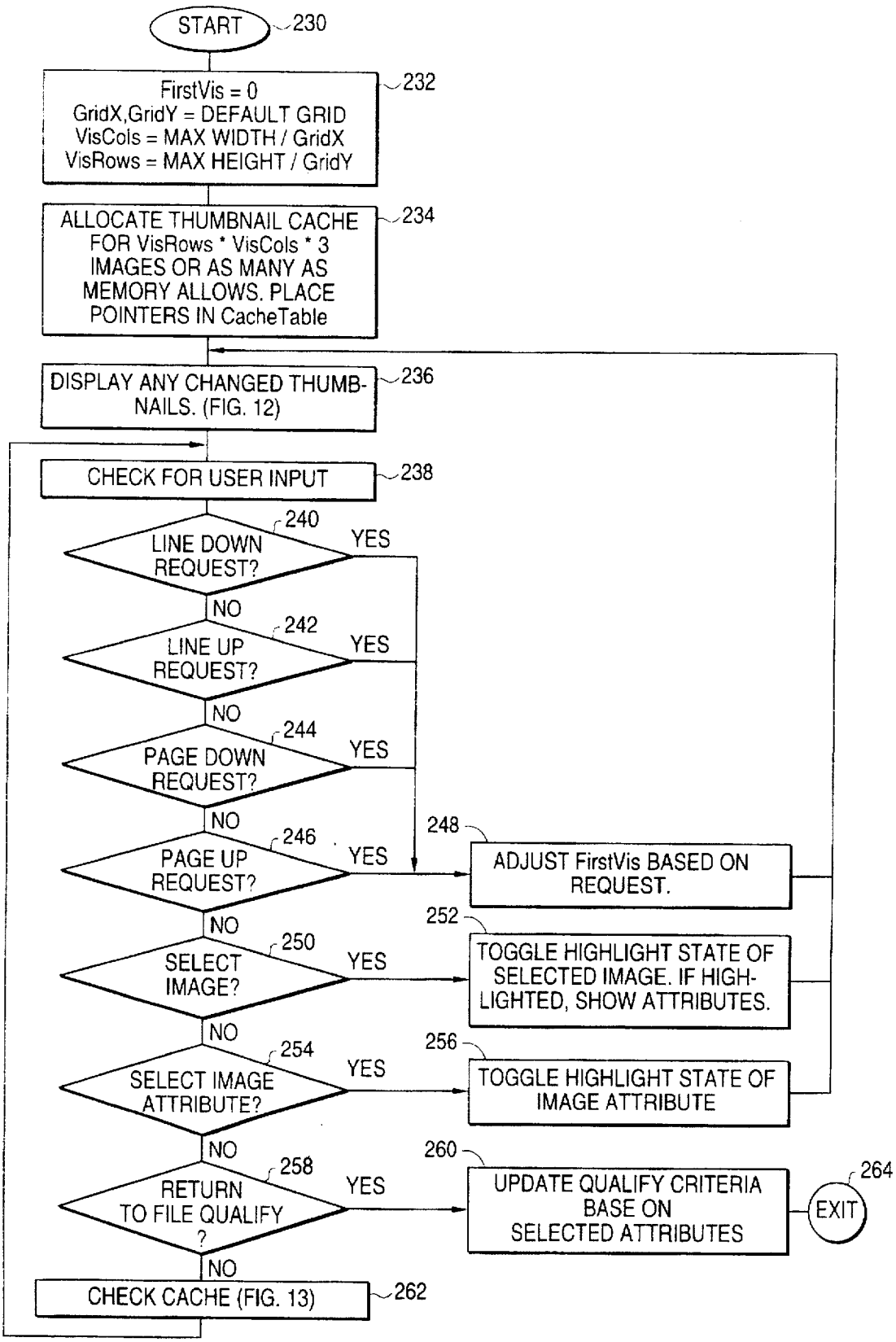
FIG. 11 is a flowchart of thumbnail selection control flow.

The thumbnail selection, control flow and size control are illustrated in FIG. 11 and starts by initializing 232 display pointer values for the locations of the thumbnail images and the size of the thumbnail display. Prior to this initialization the user has selected a screen size either explicitly by "clicking-on" the size menu or through a default. If a size other than the default size is selected appropriate new row and column maximum values are calculated. Next, the system allocates 234 a thumbnail cache of a size at least sufficient for the display and larger if possible, and places the pointers for the thumbnails discovered in the search in a cache table which will be discussed in more detail with respect to FIG. 14. The system then displays 236 any changed thumbnails as will be discussed in more detail with respect to FIG. 12. Once the thumbnails are displayed, the system checks 238 the user interface buffer which buffers user commands from devices such as a mouse or a keyboard. The system then determines whether a line down request 240, a line up request 242, a page down request 244 or a page up request to have occurred. If so, the view of the images is adjusted 248 in response thereto by updating the FirstVis pointer based on the number of images per row, copying the image up or down a row as required and drawing newly visible thumbnails. If no up or down requests have been made the system determines 250 whether one of the thumbnail images has been selected and if so toggels 252 a highlight indicator for this image when the display change function 236 is again executed. The highlighting is accomplished by a conventional bold black outline around the selected image. If a particular image attribute has been selected 254, this attribute is toggeled 256 for highlighting. In this situation, if one or more of the dominant colors of a highlighted image are selected it will become highlighted allowing a user to further change search criteria using image attributes such as a dominant colors. If the user has requested 258 to return to the file qualification screen, which will be discussed in more detail later, the system updates 260 the search criteria by loading the qualification screen buffer with the selected attribute criteria. The system then checks 262 the cache as will be discussed in more detail with respect to FIG. 13. The cache checking is performed at this point to allow predictive preloading of images in anticipation of a scrolling operation by the user. For faster user responsiveness only one image is processed per wait loop.

During thumbnail display a window array is assigned for display of the thumbnails. As each thumbnail is displayed the thumbnail color data is translated to the display palette values and copied to the next available array location. The data is also copied into memory and as many thumbnails as possible are kept in the memory so that line scrolling and paging can be accomplished at high speed. It is preferred that the RAM memory of the preferred processor include as much memory as economically possible to facilitate rapid scrolling.

Figures 12A, 12B:
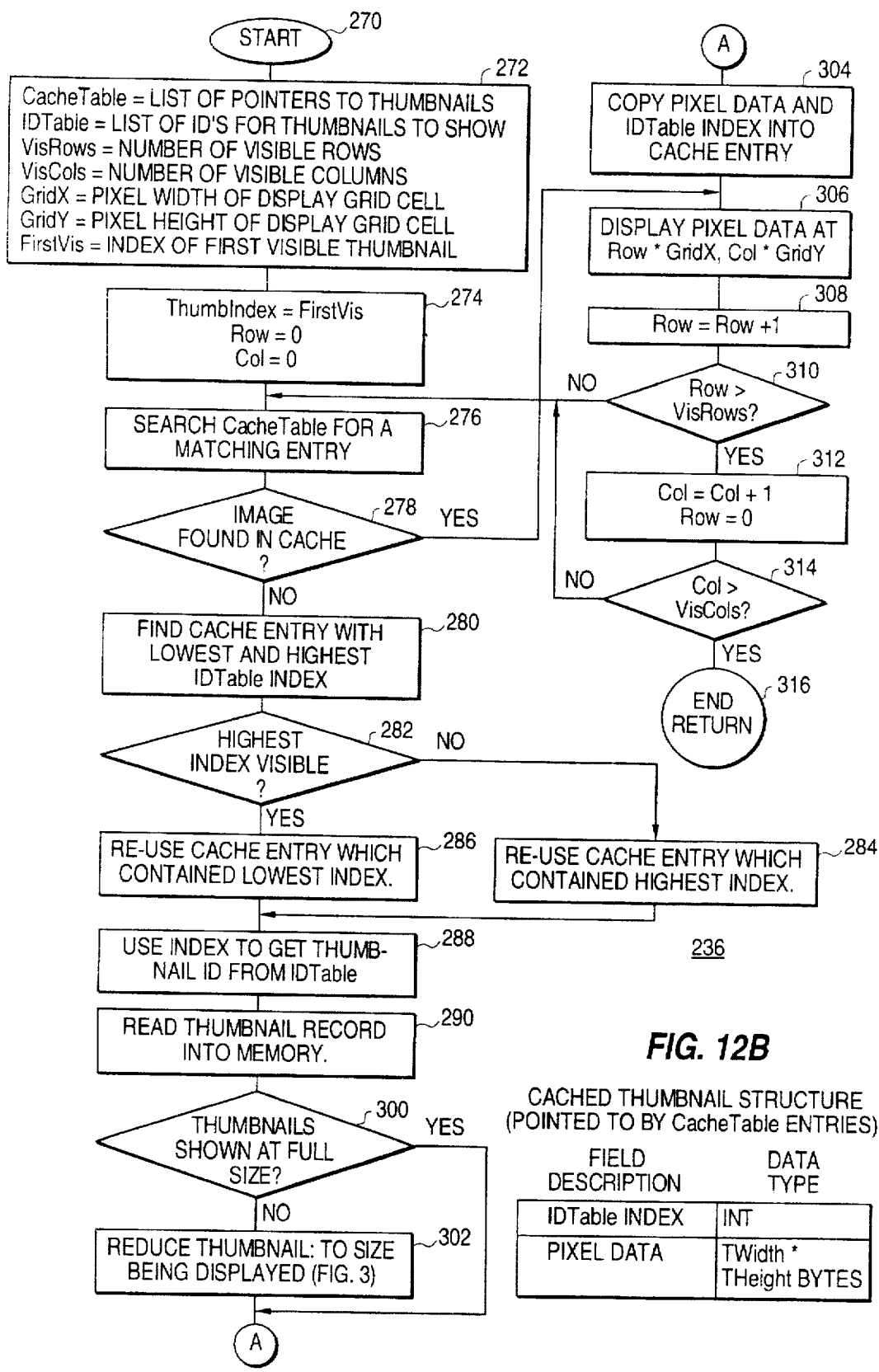
FIG. 12A depicts the process of displaying thumbnails.
FIG. 12B depicts the data structure of cached thumbnails.

The display of thumbnails in step 236 starts, as illustrated in FIG. 12A, by initializing 272 the appropriate parameters and then setting 274 the view pointers. The system first searches 276 the cache table of FIG. 14 using the ID table list of FIG. 14 to determine whether there is a matching entry for the ID table entry. If a match 278 is not found the cache entry with the highest and lowest ID table index is found 280. Next a determination 282 is made concerning whether the highest index is visible. The highest index is visible if index≧FirstVis AND index<FirstVis+(VisRows*VisCols). If the highest index is not visible, the cache entry with the highest index is reused 284. If the highest index is visible, the cache index with the lowest entry value is reused 286. The index is used to obtain 288 the ID thumbnail from the ID table list and the corresponding thumbnail record of FIG. 7A is read 290 into memory and stored in a data structure as illustrated in FIG. 12B. The system then determines 300 whether the thumbnail is to be shown at full size and if not, the thumbnail is reduced to the size to be displayed. Preferably this reduction should use the fast reduction method discussed with respect to FIG. 3. The pixel data and ID table index is then copied 304 into the cache entry of FIG. 14 and displayed 306 at the location in the display designated by the pointers. The row and column pointers are then updated and tested 308–314.

Figure 13:
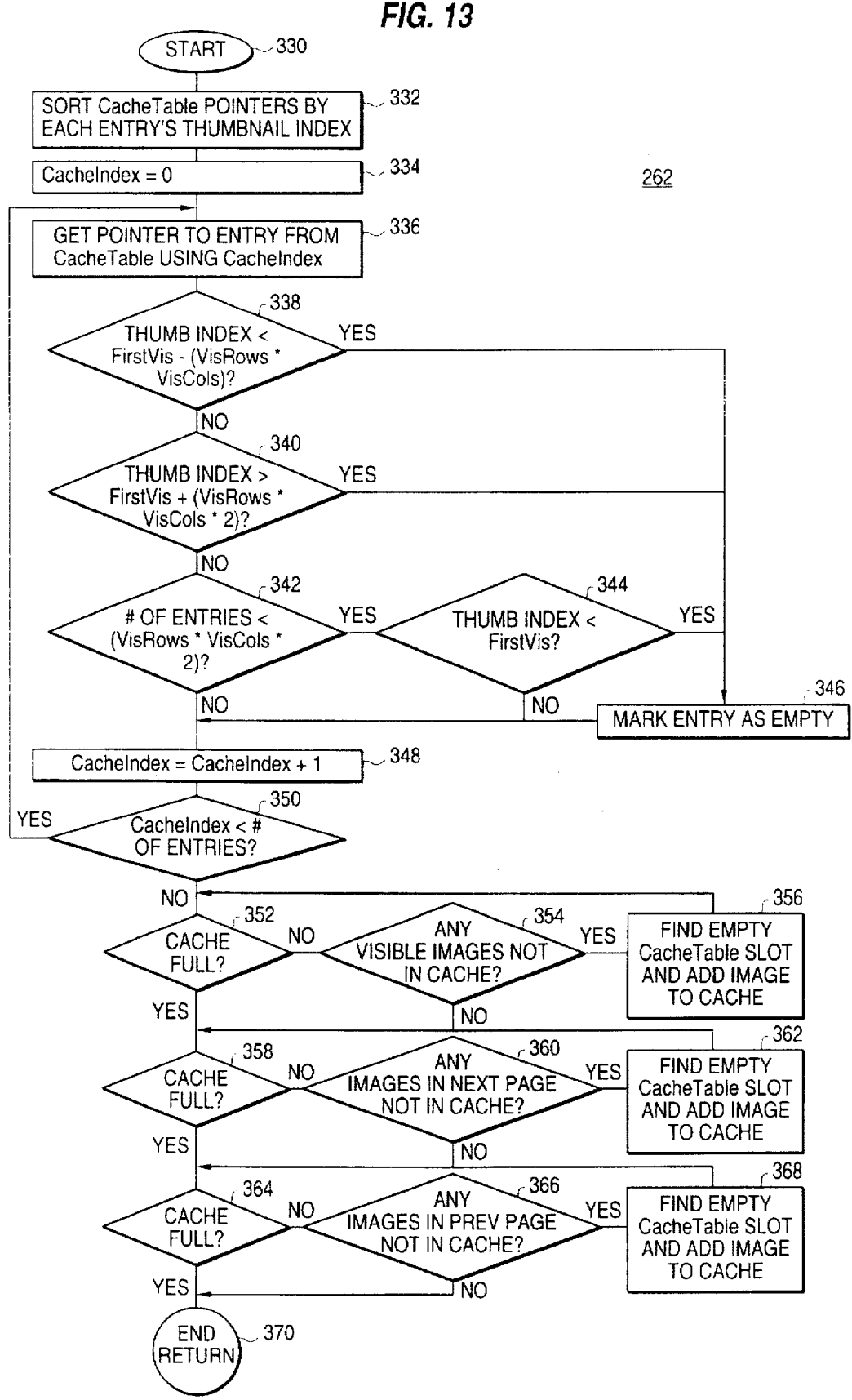
FIG. 13 shows the algorithm for checking the thumbnail cache for images.
Figure 14:
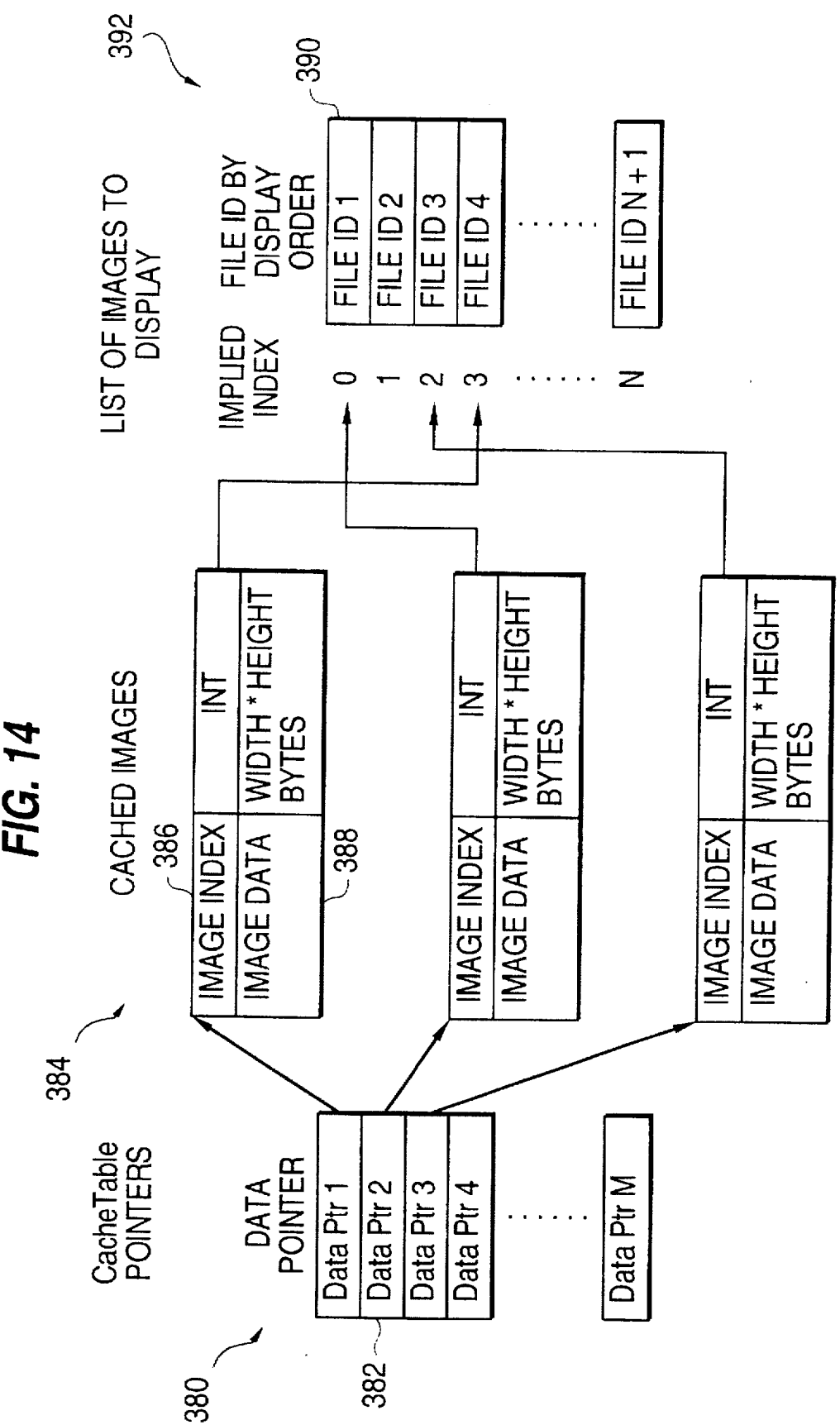
FIG. 14 depicts the database relationships between thumbnail cache pointers, images and a list of images to be displayed.

The cache checking procedure 262 mentioned in FIG. 11 is illustrated in FIG. 13 and starts by sorting 332 the cache table pointer of FIG. 14 by the thumbnail index of FIG. 12B followed by setting 334 the cache index to zero. Next the pointer from the cache table illustrated in FIG. 14 is obtained using the cache index. The thumbnail index from FIG. 12B, which points to the correct entry in the list of file ID's to display (See 390 in FIG. 14), is tested 338 to determine whether it is less than the index of the first visible thumbnail minus the number displayed, if not, the index is tested 340 to determine whether it is greater than twice this number. If not, the number of entries in the cache is tested 342. If the number of entries is less than twice the size of the display, then the thumbnail index is tested 344 against the first index of the first visible thumbnail. If it is less, then the entry is marked 346 as empty followed by an updating 348 of the cache index. If the cache index is less 350 than the number of entries in the cache, the loop is performed again. If not, a determination 352 is made as to whether the cache is full. If the cache is not full, a determination is made as to whether any of the visible images are not in the cache, if so, an empty slot in the cache table is found 358 and an image is added to the cache and the system again checks 352 to see if the cache is full. When visible images are all in the cache or the cache is full, the system again checks 358 to see if the cache is full. If not, a determination 360 is made concerning whether any of the images in the next page are not in the cache. If so, once again an empty slot is found 362 and the images are added to the cache. When all the images in the next page have been added or the cache is full, the system again determines 364 whether the cache is full. If not, a determination is made 366 as to whether any images in the previous page are not in the cache. If so, once again an empty slot is found 368 and the image is added to the cache.

The data structures associated with thumbnail caching, as illustrated in FIG. 14, include a cache table 380 with pointers to the entries in cached images in the storage 382 set aside for cached images. The cached images include an image index 386 and the image data 388. Each of the cached images points to the appropriate file ID 390 in a cache table list 392 of images to be displayed which is obtained during the searching process to be discussed in more detail later.

Figure 15:
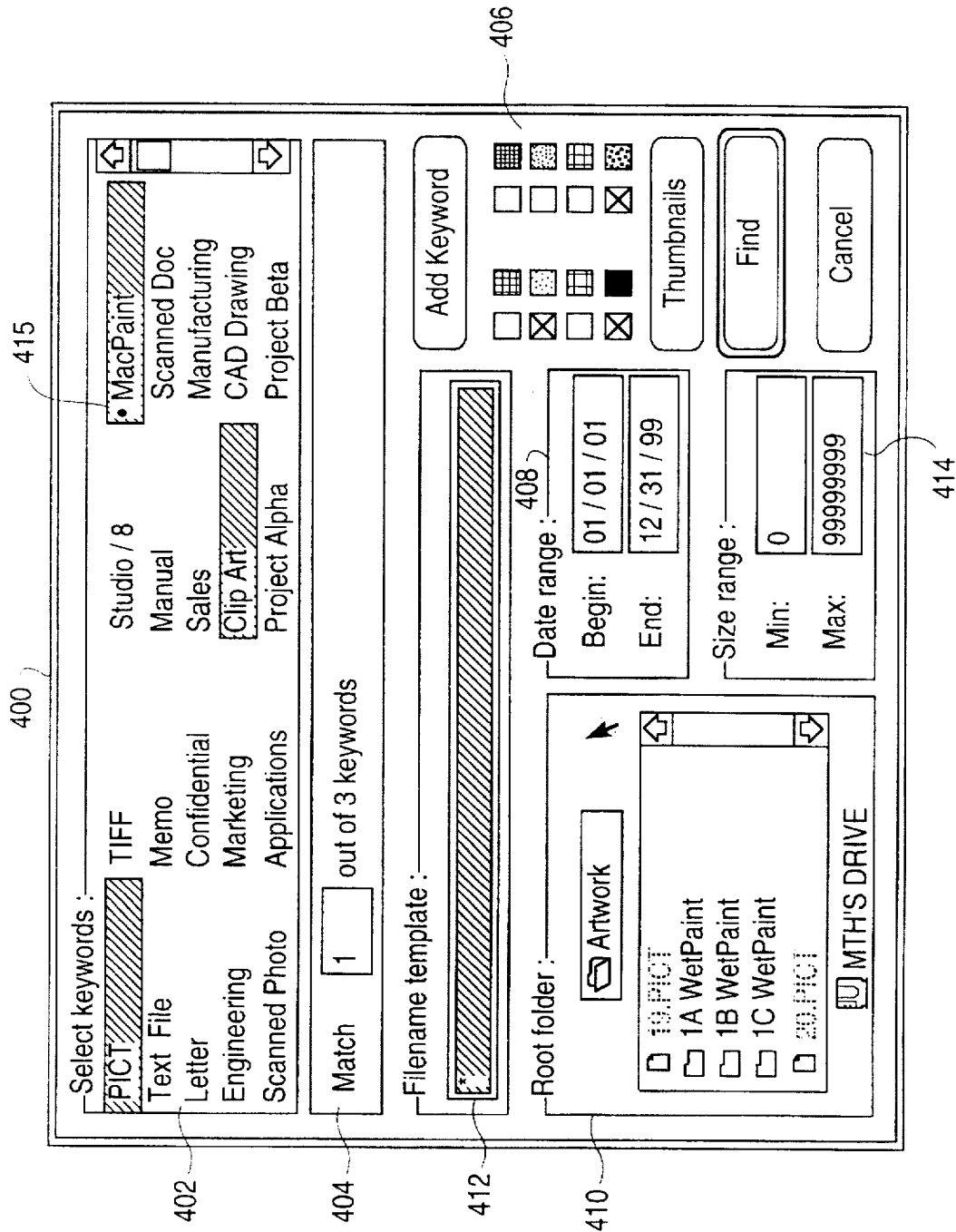
FIG. 15 is a file specification screen used to select search criteria.

To improve the file selection process, a file qualification screen as illustrated in FIG. 15 is provided which allows the number of files (images) presented to the user to be reduced, an important consideration when many thousands of images are stored. This screen 400 displays the keywords in a scrollable list screen section 402 and also allows the user to indicate the number of matches from among the keywords selected which are required. The screen shows three keywords have been chosen. The system will allow certain keywords to be designated as must match keywords by "clicking-on" the keyword with a must match option key depressed, thereby flagging these words with a visual indicator 415. A color selection portion 406 of the screen 400 allows the colors of the images to be selected using color boxes or alternately and not shown using color sliders. Initially this screen shows the normalized colors previously mentioned, however, if a dominant color is selected via the screens of FIGS. 8–10, the dominant color will be substituted for one of the colors. If the user "double-clicks" on one of the colors the color menu of the computer system, which in the preferred embodiment will be the Mackintosh color picker, is displayed. The system also allows data ranges 408 and file selection criteria 410 to be entered. The file name template 412 allows conventional wildcard file criteria to be used in the selection criteria. A file name template 412 can also be created along with maximum and minimum file size criteria 414. This screen 400 is used to input file matching criteria.

The present invention is designed to allow fast matching of m out of n keywords (along with other search criteria as illustrated in FIG. 15), when hundreds of thousands of files are being managed and provides a unique method of searching keyword data. The method revolves around three features: reducing the amount of data necessary to associate a keyword with a file, efficiently scanning through a very large sorted list from several points or views at the same time (in parallel), and an index structure which does not have a one to one relationship to records in any one file.

Figure 16:
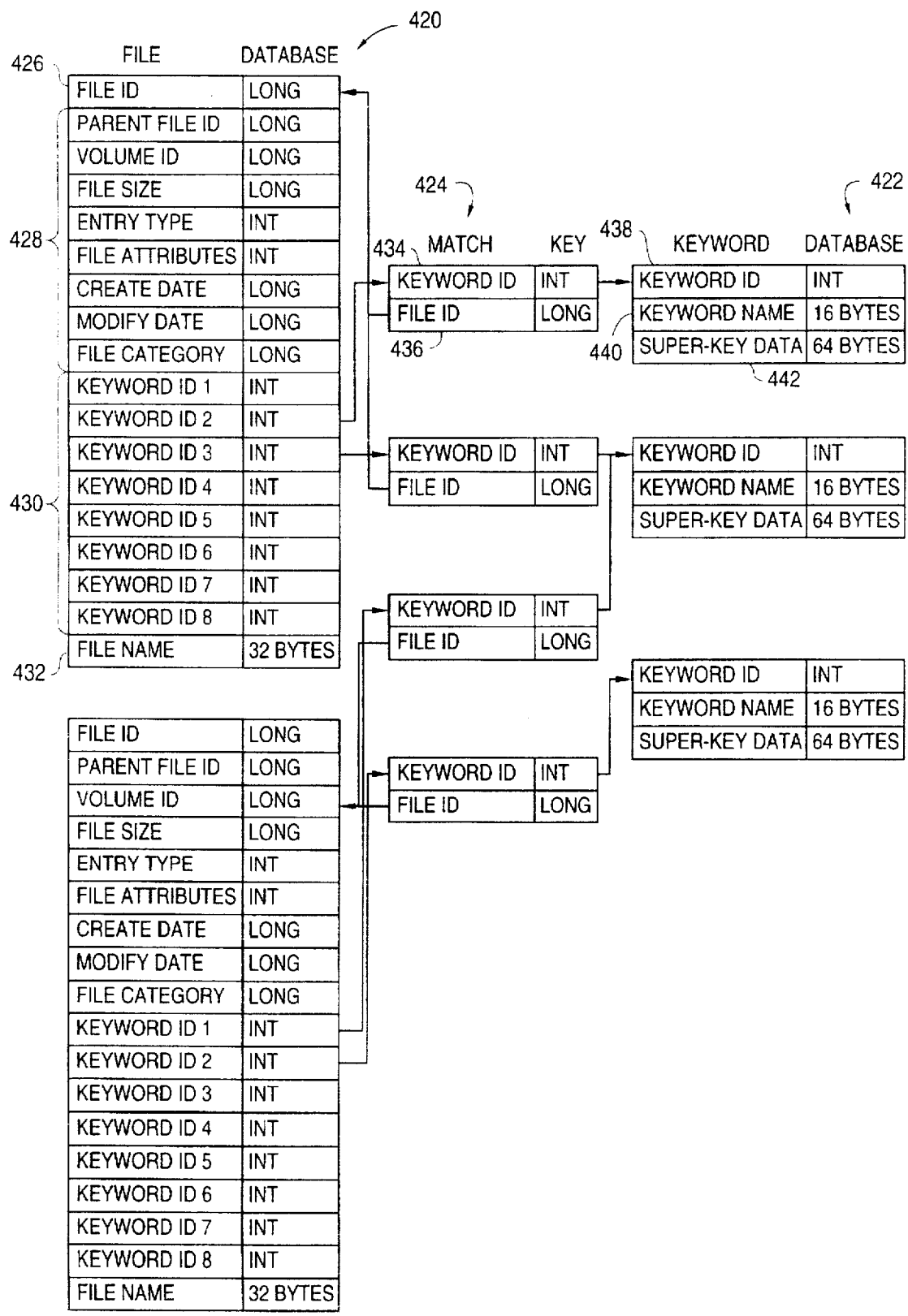
FIG. 16 illustrates the databases used in keyword searches.
Figure 17:
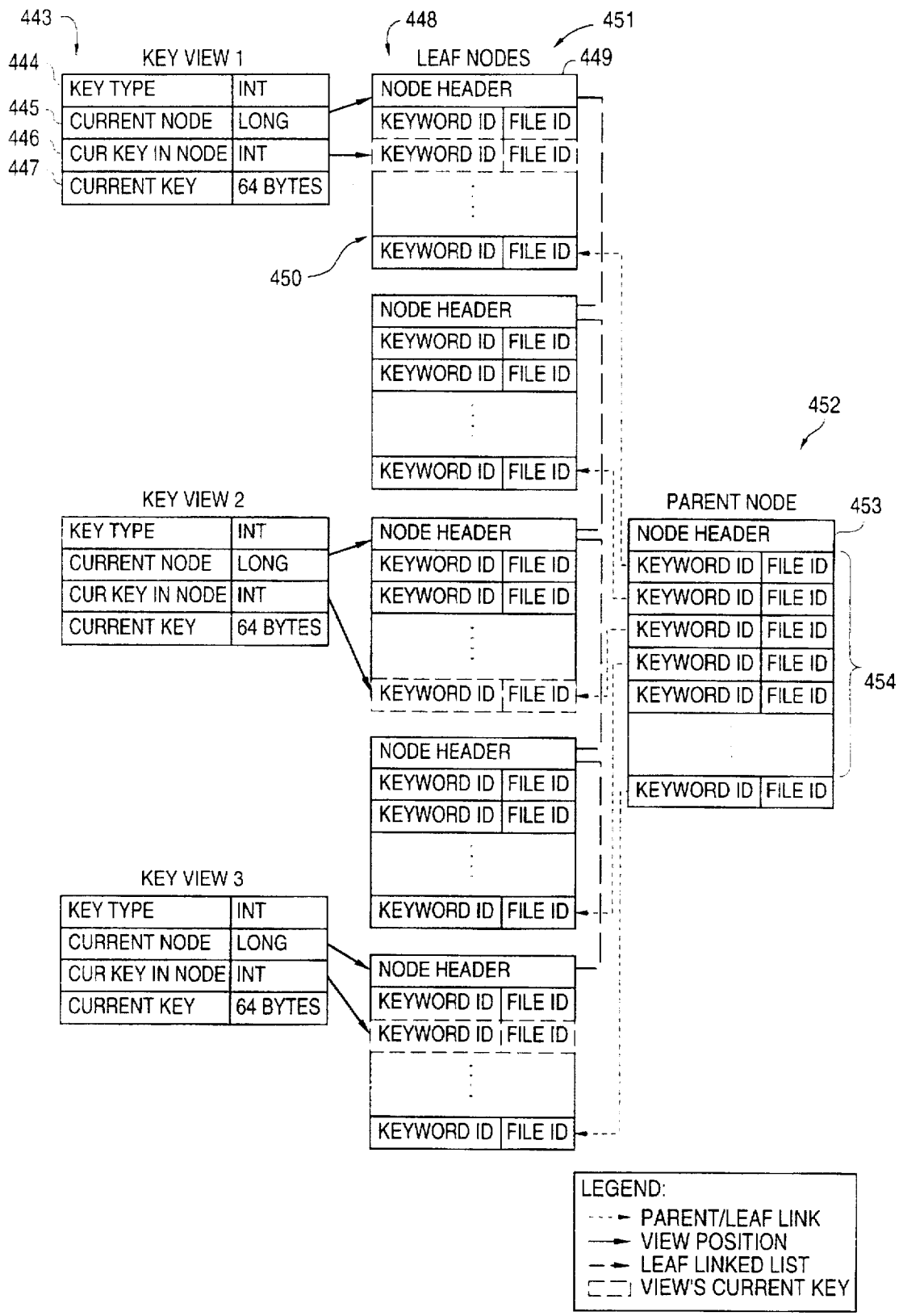
FIG. 17 depicts a binary index tree of keywords with three views.

Three databases are involved in the keyword searching process as illustrated in FIG. 16 The file databases 420, the match key or keyword search index database 424 and the keyword database 422. The file database 420 contains a file ID 426, file location and relationship information 428 including file type (image, text, etc.) and n, in this example eight, slots 430 to hold keyword ID's allowing for up to n keywords, a file name 438, the actual keyword name 440 and superkey data 442 which will be discussed in more detail later. The name 440 is used only for display purposes on the screen of FIG. 15 and the keyword ID's are assigned sequentially as created. The keyword search index database 424 includes a keyword ID 434 and a file ID 436. As can be seen from the pointer relationships illustrated in FIG. 16 several match keys can point to the same file 420 and to the same keyword 422. The keyword search index database 424 is maintained in a binary tree index database, as illustrated in FIG. 17. The key does not have a one to one relationship to records in any one file. Instead the key acts as a cross reference between the two other databases. The key (FIG. 16) consists of only two fields, a 16 bit keyword ID 434 and a 32 bit file ID 436. This is sufficient to associate a keyword with a file. The index file has been especially designed to allow multiple concurrent views into the sorted keyword list. Each view is a look into the image database from the point of view of the corresponding keyword. The database structure of FIG. 17, is used to correlate the matching of keywords of a file. This is the structure into which the keys 424 of FIG. 16 are arranged for searching. Each keyview 443 includes a key type 444, a current node 445, a current key 476 within the node and the current key 447. Each leaf node 448 includes a header 449 pointing to the next node and a list 450 of keyword ID's and file ID's. The parent node 452 includes a node header 453 and a list 454 of the last keywords in each leaf node. The list of keywords and file ID's shown in FIG. 17 is a sorted list 448 where every file ID associated with a particular keyword is in sorted order. That is, the list is sorted by keyword ID and then by file ID within keyword ID. Each leaf node points to the next leaf node which continues the sorted list. The parent node 452 keeps a list of the keyword IDs and file IDs in the sorted list and points to the first location for that keyword ID in the sorted list 448. The parent node is used initially to find the entry point in the sorted list where the first match for each keyview can be found. As the search progresses, the current key 446 advances within the entries of the node and between the nodes. The current key in the node 446 for each keyview advances through the tree entries at different rates To determine the number of matches, the file ID of a keyview is essentially compared with the file IDs of the other keyviews and if more than m out of n keyviews point to the same file ID, the file ID is saved as satisfying the criteria of the search. During current key 446 advancement, all of the current key views with the lowest file ID are advanced first. The details of the match operation are discussed in more detail with respect to FIG. 18, however, this method could be called a parallel database keyword searching method or a parallel multiple keyword search.

Figure 18:
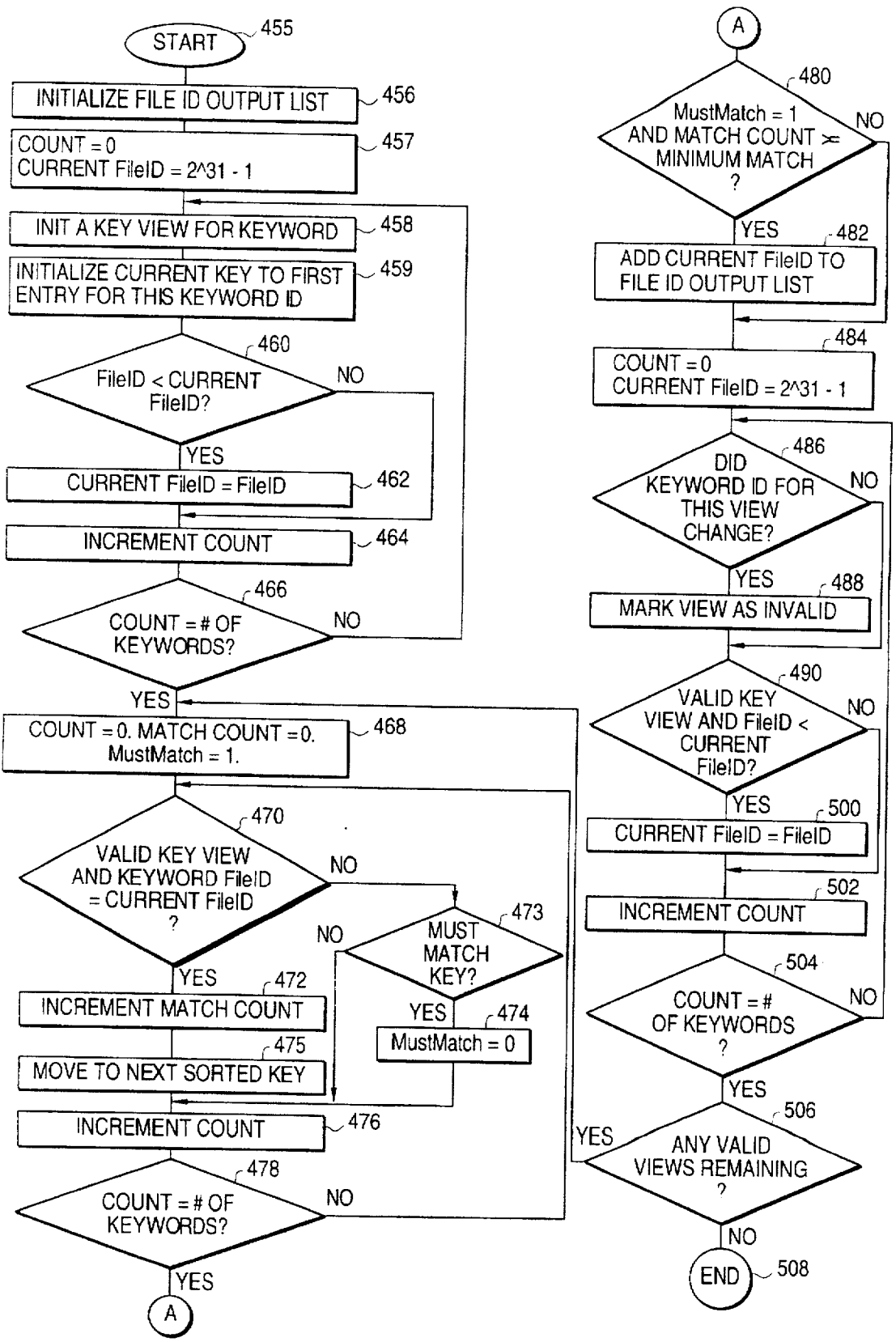
FIG. 18 is the process for m out of n keyword matching.

When a file specification screen as illustrated in FIG. 15 is completed and a search is requested, the process illustrated in FIG. 18 which performs an m out of n keyword match is performed. The keywords that can be used for searching and which are displayed in the keyword display 402 of FIG. 15 are kept in a separate file. The user is shown the keywords, selects from among the keywords and indicates how many must match. Once the keyword search is completed the output file list is scanned for comparison with other criteria, such as image size, which will be discussed with respect to FIG. 21, dominant color, which will be discussed with respect to FIG. 20, file size, start and end date, etc. In practice it is preferred that dominant color searching follow keyword searching and that, the remaining searches be in the order of file information, file name, size and dates. The order of searching on the keyword output list is from the most efficient search to the least efficient search in terms of what type of search will most effectively reduce the size of the file output list. Of course if no keywords are selected, the next type of scan comparison is performed until all file selection criteria have been used to search the files.

The first steps 456 and 457, of FIG. 18, initialize an output array for holding the matching 32 bit file ID's and sets the variables for the count and the current file ID appropriately. The process then establishes m views into the sorted list, each pointing to the first entry for one of the m keyword ID's. This operation involves initiating 458 a keyview for a keyword, initializing 459 the current key to the first entry for this keyword ID by finding a match in the parent node 452 and following the pointer to the location in the leaf nodes 448, comparing 460 the file ID for the current file ID and setting 462 the current file ID appropriately. If a match in the parent node does not occur the view is marked invalid. As each keyview is created, a keyview count is incremented 464 and tested 466 to determine whether the count is equal to the number of keywords. If not, the loop for establishing views is continued. This establishes a current key for each keyword. If any keyword ID does not exist, its view is marked as invalid, that is, it is treated as if it has reached the end of the searching process.

Once the views are established, the count and match count parameters are set 468 to zero. Out of the current keys which are still valid, the lowest associated file ID is determined. If the number of keys with the same lowest file ID is greater or equal to n, the file ID is added to a list of matching file IDs. The number is counted by first comparing 470 the valid keyview with the current file ID and incrementing the match count 472 if a match occurs. If there is no match a check 473 to determine whether this is a keyview for a must match key is made. If the view is a must match view, the must match count is set 474 to zero. If there was a match and the match count was incremented the system then moves 475 to the next sorted key, increments 476 the count and compares 478 the count to the number of keywords. If the count is not equal to the number of keywords, then a loopback occurs. If the count and the number of keywords match, and if the must match indicator is one and the match count is greater 480 than the minimum match, then the current file ID is added 482 to the output list. The count and the current file ID are reset 484 and all keys with this lowest file ID are advanced to point to the next key for that keyword. All others are left alone. If any key hits the end of the list for that keyword ID, that view is flagged as being invalid for future iterations. This is performed by determining 486 whether the keyword ID for this view has changed and marking 488 the view as invalid if so. The entries in the list 448 are in keyword ID order and when a keyword ID for a view changes then the end of the list of files with that keyword has been reached and that keyword no longer needs to be searched and is therefore set invalid.

The system then compares the valid keyview and field ID with the current file ID and if the current file ID is greater, the current file ID is updated 500 to the lowest file ID among the keyviews, followed by an incrementation 502 of the count and a comparison of 504 of the count with a number of keywords. If any valid views remain 506, the system continues with the previous steps until enough views have been marked invalid. The check 506 involves counting the number of views remaining and if less than the number required for a match remain the process stops. When all views have been marked invalid the output list of file IDs now contains all files which match m out of n keywords. Pseudocode which describes the above algorithm in even more detail is included in the microfiche appendix attached hereto.

The keywords, as mentioned previously, can include super-keywords as illustrated in FIG. 19A. The super-keywords have been established because each individual needing access to files from a very large set of files could have certain unique usage patterns. Perhaps most needed files are in one branch of the directory hierarchy or perhaps images of a certain size are accessed more often than others. To accommodate individual habits, an often used set of a qualification criteria can be remembered and assigned a name. This new keyword will then be presented along with generic system wide keywords in the file qualification screen of FIG. 15 as a super-keyword. To differentiate the keyword from a super-keyword, a super-keyword is preferably shown in bold. A super-keyword can be used in two ways. First, it can be selected along with other keywords and the restrictions it imposes will apply to the selected files or, second, the keyword can be selected to fill out the qualification form with its custom values for further modification. The data structure of a keyword 510 and a superkeyword 511 are illustrated in FIG. 19A. The keyword 510 includes an ID 512 and a name 513. The super-keyword 511 includes the keyword ID 512 and keyword name 513 along with a super-keyword flag 514 and additional file information 515 including a wild card name and a parent file ID which identifies the highest file ID within the structure being searched. This super-keyword can include up to 8 keywords 516 and 4 dominant colors 517. The keyword 510 and super-keyword 511 also have associated therewith a keyword index 518 as illustrated in FIG. 19B which includes a keyword ID 519 and a record number 520.

Figure 20:
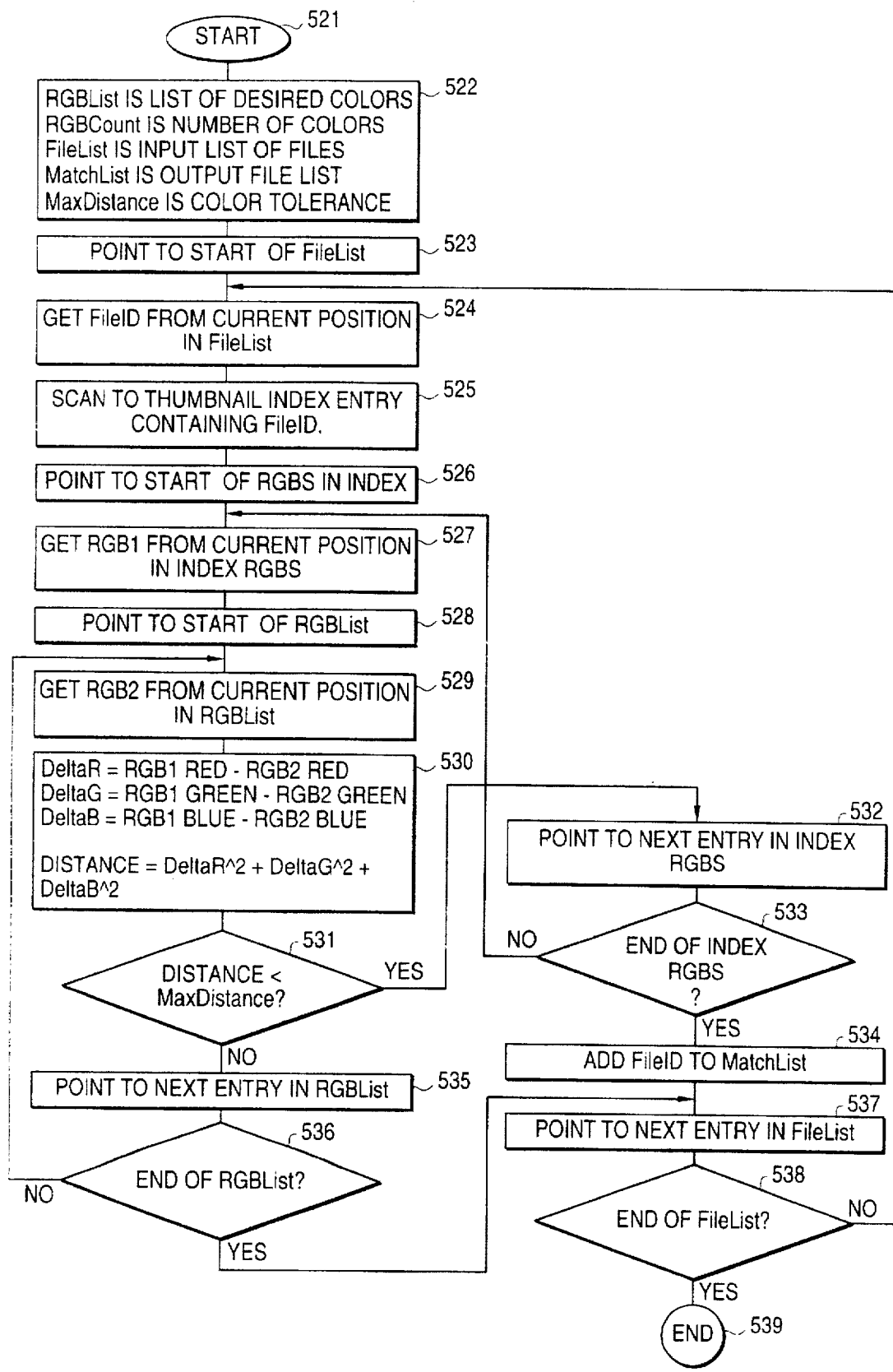
FIG. 20 depicts the flowchart for a dominant color search.
Figure 21:
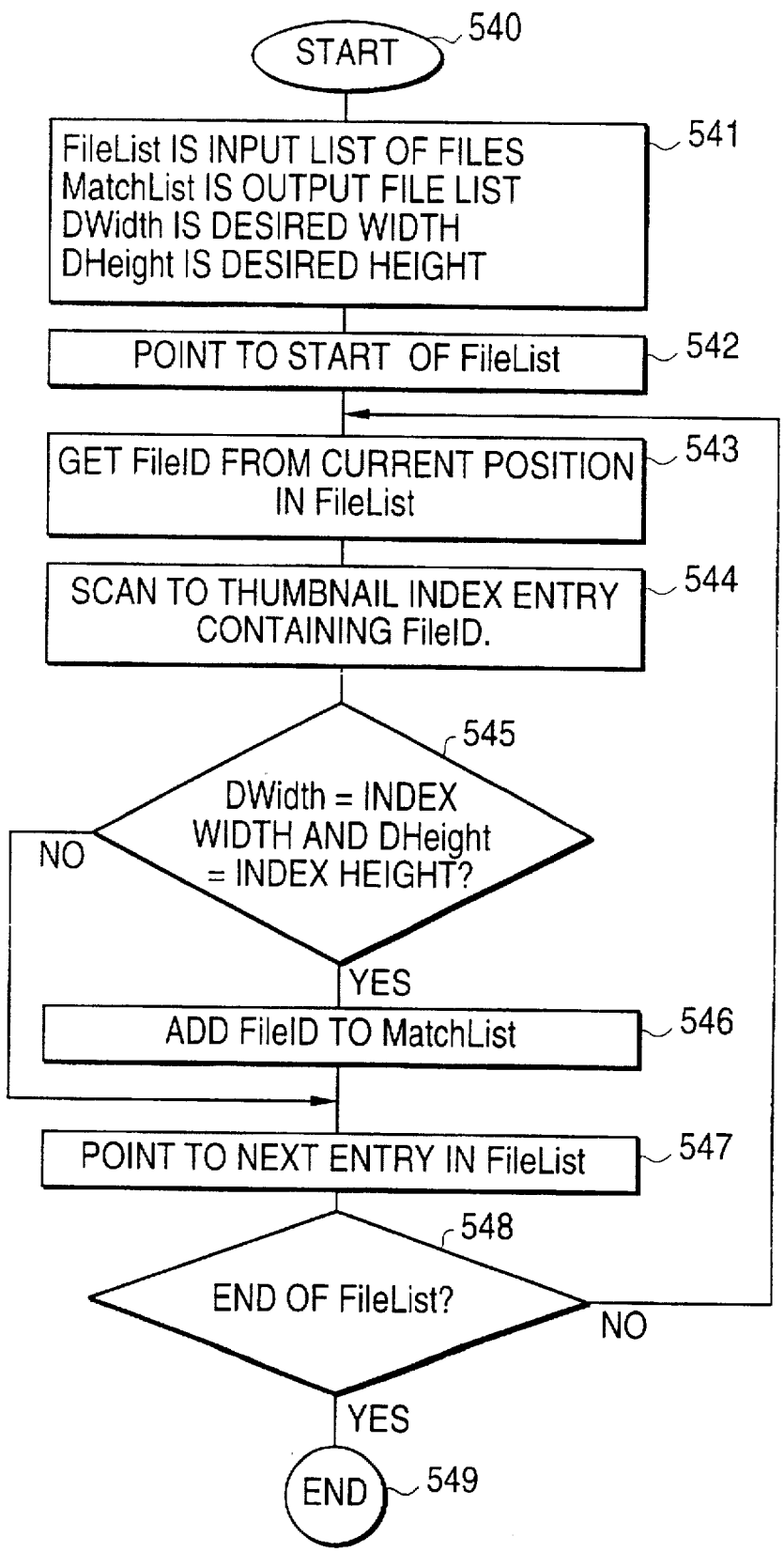
FIG. 21 illustrates the image size search.

A dominant color search, as illustrated in FIG. 20, starts by obtaining the pointers for the lists necessary for the search and setting 523 the file list pointer to the beginning of the file list that satisfied the keyword search, or to the entire file list if an keyword search was not done. The file ID from the list is obtained 524 and the thumbnail index entry for that file ID is found 525. The pointer to the colors is reset 526 at the start and the first color entry is obtained 527. The pointer to the color list is reset 528 and the color to be matched is obtained 529. The difference in the red, green and blue values is computed 530 along with the color distance. If the distance is less 531 than the maximum distance, or color matching tolerance, the pointer is updated 532 and the end of the index list is checked 533. If the end has been reached the file ID is added 534 to the match list. If the tolerance is not met, the pointer is also updated 535 and the end of the list is checked 536. If the end has not been reached another color on the desired color list is tried. If the end of the desired colors list has been reached, the pointer is updated 537 to the next file and the end of the file list is checked 538. If the file list end has not been reached the system returns for another file entry.

A search for files with an image of a desired size starts, as did the dominant color search with a list of files along with the desired image size. The pointer to the file list is set 542 at the beginning and the file ID is obtained 543 from the list. The thumbnail index is obtained 544 and the size of the original image is compared 545. If the size matches the file is added 546 to the output file list. The file pointer is then updated 547 and the end of the list is tested.

Figure 22A:
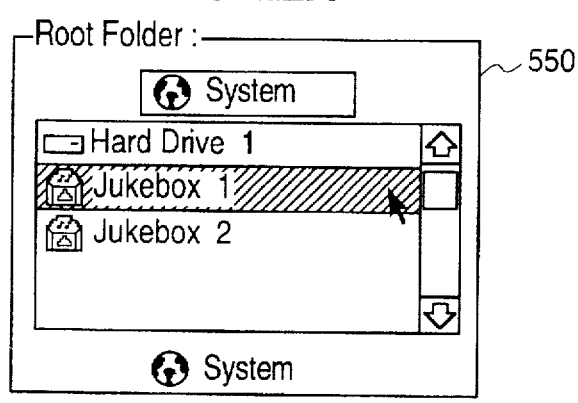
FIGS. 22A–22E depict displays showing the directory structure for multiple media file sources.
Figure 22B:
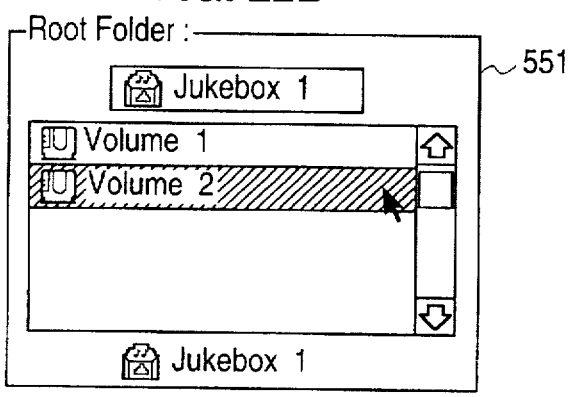
Figure 22C:
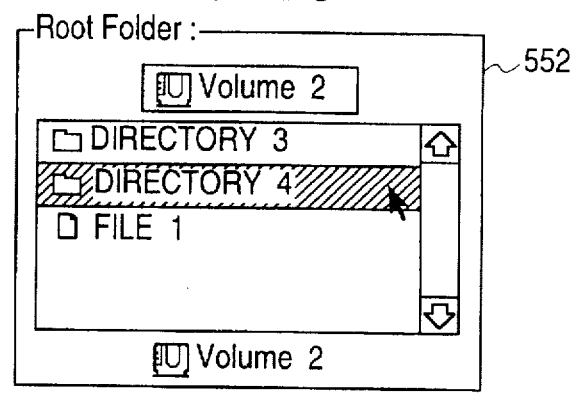
Figure 22D:
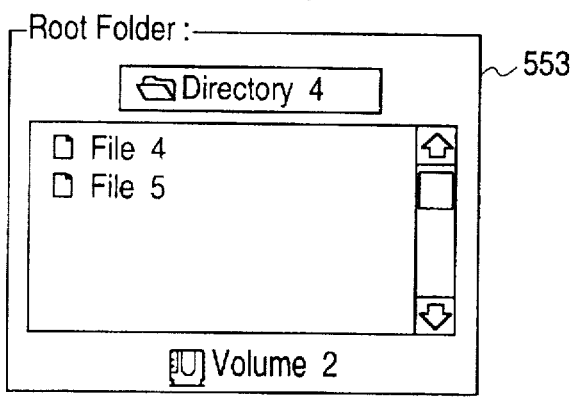
Figure 22E:
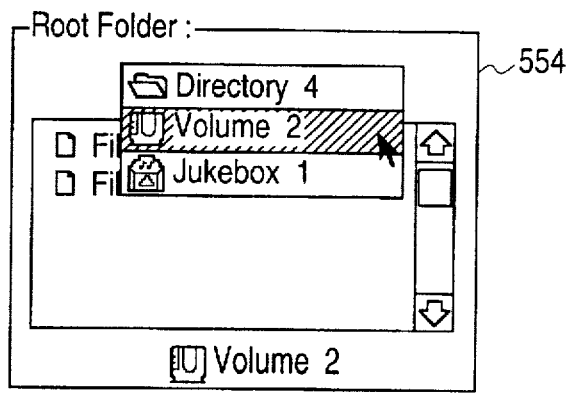

The present invention also allows a user of a multimedia system that includes not only optical disks but other types of media to select files to be acted upon from many different storage devices simultaneously. The present invention presents the contents of these many storage devices in a meaningful, nature way. If the set of all media is called "the system", the present invention presents the system as if it were a master storage device and the name of each available piece of media will appear as a directory (or folder) of the system. Finally, the full directory tree of each piece of media appears as a directory tree of the main media directory as illustrated in FIGS. 22A–22E. FIG. 22A illustrates a file server device acting as the system and that includes two optical disk jukeboxes and a single hard drive where the first jukebox has been selected. FIG. 22B illustrates the results of the FIG. 22A selection and shows the user selecting volume 2 on the first jukebox. FIG. 22C illustrates the contents of volume 2 with the user selecting directory 4. FIG. 22D illustrates the display of the contents of directory 4. When the user wishes to see the full directory tree structure of the main media directory down to the current point in the tree, the display as illustrated in FIG. 22E is shown. As can be seen this shows all parent tree structures with the current media being selected illustrated. The ability to present all files of media in this fashion depends on an efficient master file directory of all media as illustrated in FIG. 23.

Figure 24:
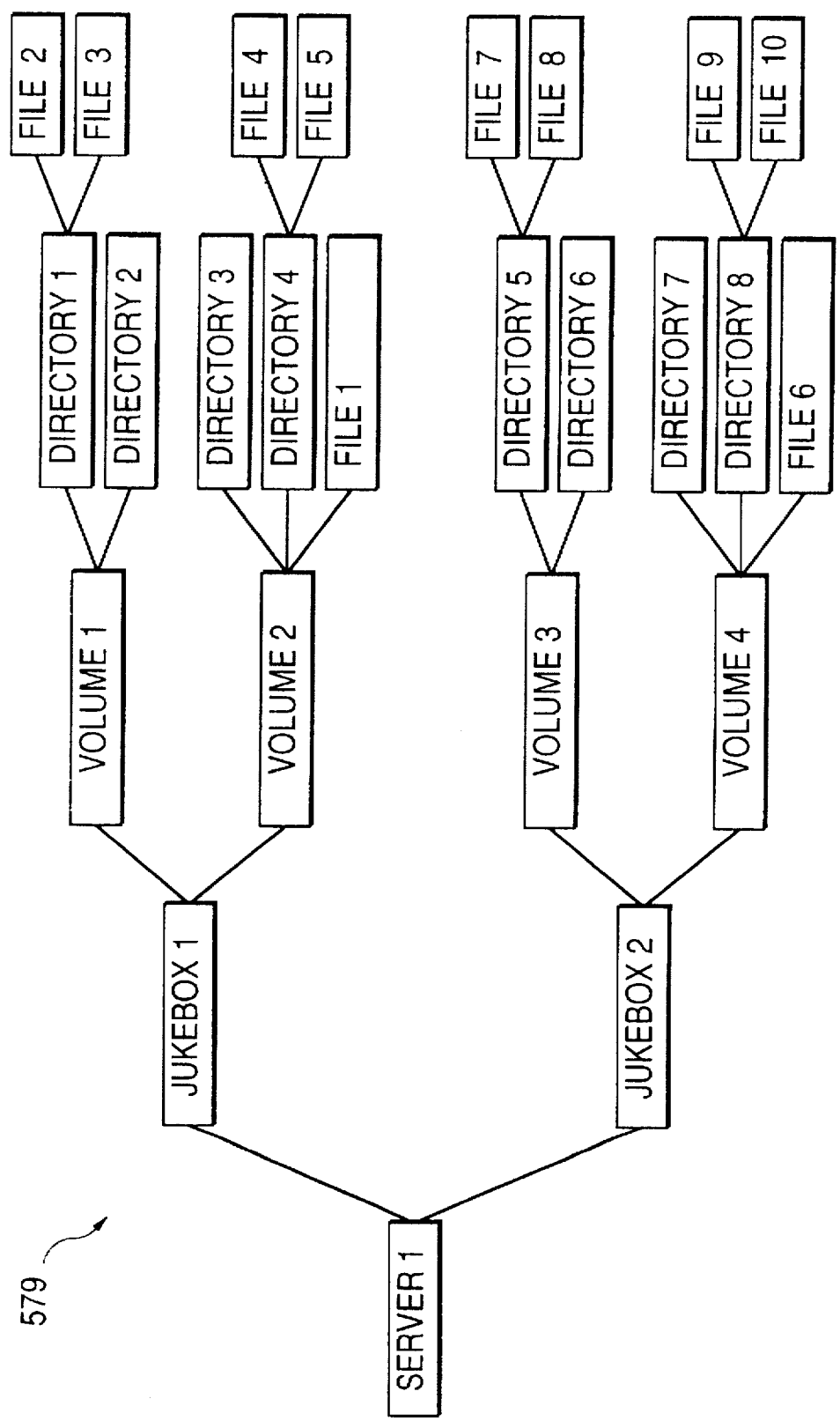
FIG. 24 illustrates the equivalent directory tree of the multi-media records of FIG. 21.

FIG. 23 illustrates a flat database file structure which has been established to efficiently represent the master system directory. There is one implied entry in the database for the system, each storage device, every directory of all storage devices and every file of all storage devices. The database file 570 has a file ID 571, a parent ID 572, an entry name 573 and other information 574 about the entry. The first entry or highest in the database is marked as having no parent with a negative record number in the parent ID field signifying the parent is the system. As storage devices are added to the system, an entry is added for each new storage device designating its parent as the system. As directories and files are added, each entry is created designating the appropriate parent. External sorts such as illustrated by the sorted index file 575 are maintained for each entry to allow efficient access to the files in meaningful orders. To allow typical alphabetical listings by directory, the sort 575 is maintained with a primary key 576, a parent ID 578 and a secondary key of entry name 577. This sort 575 is by parent ID. Even though the file 570 is a flat database, the sort 575 gives the appearance of a hierarchy 579 of directories in the system where each directory is sorted alphabetically as illustrated in FIG. 24. The microfiche appendix includes pseudocode for alphabetically sorting the database 570 to produce the sorted index 575.

When the user of the data structure illustrated in FIG. 23 wishes to display the list of entries for any parent file ID, that is, a particular subdirectory using a sort 575 such as in FIG. 23, a routine such as illustrated in FIG. 25 is performed. This process is rather rapid because an index file as illustrated in FIG. 26C is used. The first step is to set 582 the current key to the first indexed entry for the desired parent ID using a routine set forth in the attached pseudocode named JM_Scan_Files. The system then determines 484 whether the record found and the parent ID are still the desired ones. If not, the system stops. If so, the system reads 588, using routine JM_GetFileRec, the record from the database and displays 590 the file name from the record and then scans 600 to the next key using routine JM_Scan_Files. This routine produces displays similar to FIGS. 22A–22E.

In order to facilitate use of the multiple media systems additional database structures as illustrated in FIGS. 26A–29B are created and used where the terms used in the data structures are well known as to their use in the field of operating systems. The file information record and index structure are shown in FIGS. 26A–26E. These structures include a database record 620 including a file type (text, picture, etc) identified, an index key by file ID file 622 sorted lowest file ID first and index key by parent ID and file name file 624 sorted by file name, an index key by volume ID file 626 sorted by volume and an index key by file name file 628 is sorted alphabetically by file name allowing quick file name searches. The system also includes volume information record and index data structures as illustrated in FIGS. 27A–27D. FIG. 27A illustrates the volume information record 640, while FIGS. 27B–27D illustrate the index key by volume ID file 642 sorted by volume ID, the index key by media ID file 644 sorted by media ID and the index key by volume name file 646 sorted by volume name. The system also maintains records and related substructures for a multiple disk jukebox device which has one or more optical disks loaded into a disk drive and several disks off line. The jukebox information includes a main jukebox information record structure 660 as illustrated in FIG. 28A along with an element information structure 662 (FIG. 28B) which describes the physical structure of the jukebox. The system also maintains a drive information substructure 664 as illustrated in FIG. 28C along with a job pack information structure 666 illustrated in FIG. 28D. A job pack is a cassette of optical disks which can be removed from a jukebox unit. Along with the above-discussed data structures a system information record structure 640, as illustrated in FIG. 29A, is maintained along with a name ID substructure 642 (FIG. 29B).

As discussed previously the present invention includes the software necessary for the user to access image files and other types of files on various types of media. This jukebox manager kernel software includes several modules which are illustrated in FIG. 30. The pseudocode for each of these modules along with many other modules is included in the attached microfiche appendix. As illustrated in FIG. 30 the image processing operations interact with the jukebox software through two layers the jukebox manager layer and the database layer. The jukebox manager layer provides an application interface which allows full usage of the jukebox system. This layer is accessed through a command, the structure of which will be discussed with respect to FIG. 31. The jukebox manager layer includes the jukebox manager tool kit layer 702, the dispatcher 706 and the jukebox manager code 710. The layer 702 builds system command packets which are provided to the dispatcher 706 which routes the packet to the packet to the appropriate manager 710 either locally or over the network 708. The dispatcher 706 maintains a list of servers of which the current server is indicated and unless the command indicates a change in servers, the dispatcher 706 will route packets toward the current server whether remote or local. The jukebox manager layer 710 also takes care of moving offline optical cartridges on line and moving cartridges around within the jukebox such as putting them into a removable job pack. The jukebox dependent layer 712 contains all the functions which are jukebox dependent. The database layer includes a database manager layer 704 which provides database support for the other layers. The utilities layer 714 provides internal services to the jukebox manager layer and the jukebox dependent layer for internal use only. The network layer 708 provides network communications to reroute jukebox layer functions to a jukebox manager 710 running on another computer system. Commands from the network layer 708 received from a remote network layer are routed to the dispatcher 706, unless it is a communication directly with an application as identified by an application identifier range. The interface dependent layer 716 provides a communication protocol independent interface to the above layers when communicating with jukeboxes and other devices. This layer translates the commands into the appropriate commands for the particular device being commanded. The operating system dependent layer 718 provides operating system services to the above layers while hiding all the operating system dependencies, that is, for example it produces the correct disk control commands. The most important routines from among the jukebox manager (JM) kernel pseudocode set forth in the attached microfiche appendix are discussed below. A list of the routines and a brief description of the functions is also included in the microfiche.

The JM_File XXXXX function set parallels operating system file I/O functions to allow manipulation of files residing on the jukebox with auto-loading of disks and auto-updating of JBM databases. These functions work either locally, or remotely across the network NT layer 708. JM_Dispatch decides whether each JM_xxxxx function should be executed locally or remotely and dispatches the command appropriately. JM_FindMedia scans internal tables for all visible jukeboxes to determine if a particular disk is available. JM_Scan Files/JM_ScanVolumes provide functional database scanning ability for multiple simultaneous processes. The JM_Searchxxxxx function set allows extraction of a sub-set of files from the file database. This is the engine behind the file qualification entry screen. Given a set of qualification criterion, these functions will allow a subset list of files to be generated. The list is dynamic in that any subset can be removed as easily as they can be added. JM_SetDrive allows a jukebox drive to be reserved by anyone on any computer wishing to use the jukebox. This function allows the jukebox managed JBM to pick the free drive to be reserved. This same mechanism is used internally to reserve drives holding disks which have files open on them via the JM_FileXXXXX functions. JM Idle determines how long various files, users, drives have been allocated but inactive. If specified thresholds are exceeded the resources are freed up the ??? assuming that the client process went down or aborted. The JM_Initialize/UT_FindJukebox function set uses a 'smart' algorithm to determine which jukeboxes are attached to the system. This allows a totally automatic configuration to occur, even when multiple jukeboxes are attached to a system. JM_SendCommand/JM_Set DispatchProc set of functions allows an application to use the network layer 708 to send it's own command packets. This allows server/client conversations at the layer above the Kernel. JM_Inventory updates the volume information database to reflect the actual disks held by the jukebox by reading each volume label. The DB_NdxXXXXX functions use a scheme of ram-cached B-tree nodes to access disks which minimizes disk accesses. Test have shown a hit rate of about 97%. Also writes to disk are minimized when adding or deleting multiple keys. DB_NdxXXXXXX function set allows for key views which each maintain a set of current scan position information allowing multiple simultaneous searching of a sorted list as discussed previously with respect FIGS. 17 and 18. UT_FileIDtoPathName walks through the file database parent ID links of FIG. 21 to create a full O/S compatible file pathname for use in OS Filexxxx calls. The UT_MakeVolumeName/UT_GetEleMediAID/UT_RemoveMail functions manage a set of pseudo volume names for those disks which have no volume name, have not been formatted or have not been certified. These names are maintained like normal volume names, but disappear if the disk is removed from the jukebox. This mechanism allows unnamed volumes to be manipulated with the same high level user-friendliness as named volumes, without cluttering the databases. UT_PickSlot will pick either a jobpack slot or non-jobpack slot (or either) for JM_ReceiveMail. UT_SendMessage/OS Message provides a platform independent messaging system, including response ability. The NT_xxxx functions allow all JM_xxxxx functions to execute on a remote jukebox server. Also for the server, the NT layer 708 can handle incoming requests from multiple clients wishing to use the jukebox. JM_LoadJobpack automatically moves a specified list of disks into the jobpack and other disks will automatically be removed, if necessary, as needed to make room. To facilitate a uniform interface with both local and remote jukebox manager kernels a command structure for commands provided by the jukebox manager tool kit layer to the dispatcher 706 should be used in a form as illustrated in FIG. 29. This command structure 730 specifies the type of command 732, the data parameters 734, file and device identifiers 736 and control parameters 738 as well as other information.

Whenever a file is opened on a jukebox, an open file information structure 740, as illustrated in FIG. 32, is maintained for each file opened by a client of the jukebox server. Each time the file is used by the client, the last access field 742 is updated. An expiration time can be set to cause a file to be automatically closed if not accessed for longer than a specified time threshold. This is necessary to accommodate lost connections and/or poorly written client software. If the client disconnects before the file is closed, the file will be closed automatically and the open file information record 740 will be freed. For each separate usage of a database file index by each client, an open keyview information structure 750 as illustrated in FIG. 33 is allocated and maintained. The view is closed and the open keyview information structure 750 is freed whenever a client disconnects or a scan of the index reaches the end of the sorted list.

In some situations the index file contains highly redundant information and a packed format, as illustrated in FIG. 34, is preferably used which reduces the redundant portion of the key to a one byte count of how many bits are redundant with the previous key. Each index node starts with a key which has a reduced count of zero and therefore actually consumes one more bit than an unpacked key. All additional keys in each 512 bit index node will have the following length: keylength–redundantlength–redundantbitcount+1. A typical index which has many redundant fields is the sort by parent ID and file name illustrated in FIG. 26C. The index file list 448 for the m out of n search is also a typical file which is compressed in this manner. Since many files share the same parent, the long word parent ID in most cases will result in an immediate reduction of 4 bytes to 1 byte for each index entry except for directory boundaries where the parent ID changes. Also, since the file names are in sorted order, typically one or more bytes of the file name will be redundant, resulting in additional savings. The present invention also performs index node memory caching to minimize disk access. In order to facilitate this operation, the present invention maintains an index file header record 770 as illustrated in FIG. 35A, a key header record and key type descriptor 772, as illustrated in FIG. 35B, which includes a key component descriptor 774, as illustrated in FIG. 35C. The index nodes 776 read into memory are illustrated in FIG. 35D and are read into a node cache illustrated in FIG. 36 and managed by the database manager 704 of the jukebox manager kernel of FIG. 28, as illustrated in FIG. 36. If each opened index file has associated therewith a fixed number of available node cache slots for holding nodes being used by the database manager. When many indices are being added, changed or deleted, this reduces disk reads and writes dramatically. The jukebox manager kernel periodically writes all changed nodes to disk to ensure data integrity. A conventional aging algorithm is used to determine which cache slot to reuse for a newly requested node.

Figure 37:
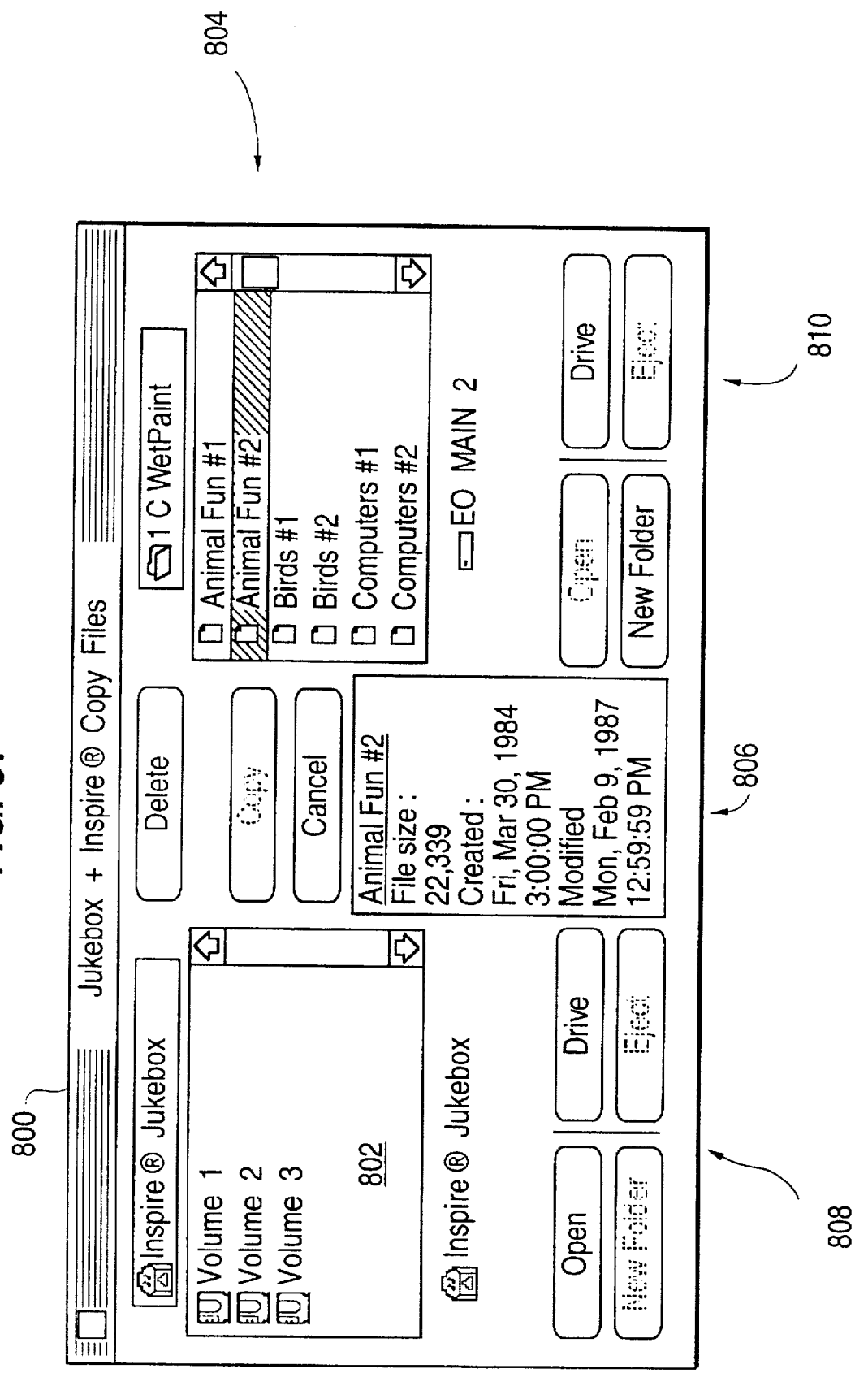
FIG. 37 illustrates a screen used to transfer files between media from remote or well as local locations.

FIG. 37 depicts a file copy screen 800 that allows the user to copy between media locally or remotely located and thus move a remote file into the user's local workspace. This screen shows the destination media directory structure 802 on the left and the directory structure 804 of the source on the right with the file names actually shown on the right, however, either side can be the source or destination depending on which side the user uses to select files. In the bottom center the file parameters for a selected file are shown. The desired media and directory for both the source and the destination are selected using the selectors 808 and 810 along the bottom of the screen 800 under the appropriate directory structure display. In the top center are the indicators 812 that can be selected to perform the operation desired. The selection of the files for transfer is performed by highlighting the desired file or directory on either side and the jukebox manager kernel discussed previously performs the transfer.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An image searching system, comprising:

keyword storage means for storing keywords corresponding to image files, the keywords being separate from of the image files;

image file storage means for storing the image files; and search means for searching the keywords using search keywords and identifying image files having m out of n of the search keywords matching the keywords.

2. A system as recited in claim 1, further comprising a super-keyword comprising search keywords and file information, said super-keyword being used by said search means.

3. A system as recited in claim 1, wherein said keyword storage means includes keyviews into the files of said file storage means for each keyword being searched by said search means.

4. A system as recited in claim 1, wherein the file keywords are in a compressed index file.

5. A system as recited in claim 1, wherein said search means searches for files having at least one dominant color.

6. A system as recited in claim 1, wherein wild card file criteria are matched by said search means.

7. A system as recited in claim 1, further comprising:

display means for displaying thumbnail images related to the image files found by said search means; and image parameter designation means for designating parameters of the thumbnail images used for searching by said search means.

8. A system as recited in claim 1, wherein said search means performs a parallel multiple keyword search.

9. An image storage system, comprising:

image storage means for storing a color image;

image processing means for producing a reduced color image having only dominant colors of the color image;

thumbnail storage means for storing the reduced color image;

display means for displaying the reduced color image as a variably sized thumbnail image;

keyword storage means for storing file keywords;

file storage means for storing files corresponding to the file keywords, the keywords forming no part of the files;

search means for searching the keywords using search keywords and identifying files having m out of n of the search keywords matching the keywords and for identifying files having one of the dominant colors; and image parameter designation means for designating parameters of the thumbnail images used for searching by said search means.

* * * * *

UNITED STATES PATENT AND TRADEMARK OFFICE
CERTIFICATE OF CORRECTION

PATENT NO.: 5,761,655
DATED : June 2, 1998
INVENTOR(S): Michael T. HOFFMAN

It is certified that error appears in the above-identified patent and that said Letters Patent is hereby corrected as shown below:

Col. 4, line 22, change "sell" to --well--.
Col. 6, line 39, change "deltax" to --deltaX--; and
    line 39, change "deltay" to --deltaY--.
Col. 12, line 29, after "rates" insert --.--.

Signed and Sealed this

Nineteenth Day of January, 1999

Attest:

Attesting Officer

*Acting Commissioner of Patents and Trademarks*